United States Patent
Wang et al.

(10) Patent No.: US 10,147,045 B2
(45) Date of Patent: Dec. 4, 2018

(54) SELF-ORGANIZED CRITICAL CMOS CIRCUITS AND METHODS FOR COMPUTATION AND INFORMATION PROCESSING

(71) Applicant: THE REGENTS OF THE UNIVERSITY OF CALIFORNIA, Oakland, CA (US)

(72) Inventors: Kang L. Wang, Santa Monica, CA (US); Hao-Yuan Chang, Folsom, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 29 days.

(21) Appl. No.: 15/346,538

(22) Filed: Nov. 8, 2016

(65) Prior Publication Data

US 2017/0124477 A1     May 4, 2017

Related U.S. Application Data

(63) Continuation of application No. PCT/US2015/030195, filed on May 11, 2015.
(Continued)

(51) Int. Cl.
*G06N 7/08* (2006.01)
*G06N 7/00* (2006.01)

(52) U.S. Cl.
CPC .............. *G06N 7/08* (2013.01); *G06N 7/005* (2013.01)

(58) Field of Classification Search
CPC .................................. G06N 7/08; G06N 7/005
See application file for complete search history.

(56) References Cited

U.S. PATENT DOCUMENTS

| | | |
|---|---|---|
| 5,134,685 A | 7/1992 | Rosenbluth |
| 6,023,562 A | 2/2000 | Baker et al. |

(Continued)

FOREIGN PATENT DOCUMENTS

| | | |
|---|---|---|
| CN | 101447140 B | 6/2009 |
| JP | 07-262159 A | 10/1995 |

(Continued)

OTHER PUBLICATIONS

Korean Intellectual Property Office (KIPO), International Search Report and Written Opinion, dated Aug. 25, 2015, related PCT International Application No. PCT/US2015/030195, pp. 1-10, with claims searched, pp. 11-17. The relevance of non-English language references JP 11-212954, JP 07-262159, and JP 11-212953 is indicated in the search report.

(Continued)

*Primary Examiner* — Bitew Dinke
(74) *Attorney, Agent, or Firm* — O'Banion & Ritchey LLP; John P. O'Banion

(57) ABSTRACT

A circuit that makes use of chaos or self-organized criticality to generate a matrix of bits for computation and information processing. The example embodiment utilizes CMOS circuitry and can solve optimization problems. A plurality of unit cells includes multiple transistors in a lattice formation that set voltages as state variables to other transistor cells. Adjustable bifurcation parameters are utilized to bring the chaotic circuit in and out of the chaotic regime. A processing unit with software are utilized for implanting a problem of interest into the chaotic circuit, while data latches or analog to digital converters provide for reading out the voltages from the chaotic circuit.

19 Claims, 17 Drawing Sheets

Related U.S. Application Data

(60) Provisional application No. 61/991,572, filed on May 11, 2014.

(56) References Cited

U.S. PATENT DOCUMENTS

| | | | | |
|---|---|---|---|---|
| 6,377,235 | B1* | 4/2002 | Murade | G09G 3/3674 345/100 |
| 6,404,260 | B1 | 6/2002 | Cruz-Albrecht et al. | |
| 6,725,437 | B1 | 4/2004 | Rao et al. | |
| 6,934,202 | B2 | 8/2005 | Ferrant | |
| 6,980,657 | B1 | 12/2005 | Hinton, Sr. | |
| 7,840,504 | B2 | 11/2010 | Sun et al. | |
| 8,543,684 | B2 | 9/2013 | Hulusi | |
| 8,645,286 | B2 | 2/2014 | Jonas et al. | |
| 8,849,580 | B2 | 9/2014 | Kauffman | |
| 2002/0008999 | A1* | 1/2002 | Hidaka | H03K 19/0016 365/200 |
| 2004/0193805 | A1* | 9/2004 | Au | G06F 5/10 711/131 |
| 2005/0005069 | A1* | 1/2005 | Au | G11C 7/1012 711/131 |
| 2005/0273297 | A1 | 12/2005 | Young | |
| 2006/0261846 | A1* | 11/2006 | Twigg | H03K 19/173 326/37 |
| 2009/0112564 | A1 | 4/2009 | Schmieder | |
| 2009/0251064 | A1* | 10/2009 | Yaita | G09G 3/3291 315/291 |
| 2011/0208676 | A1* | 8/2011 | Jonas | G06N 7/005 706/10 |
| 2014/0292369 | A1* | 10/2014 | Trefzer | H03K 19/17748 326/41 |
| 2014/0347095 | A1* | 11/2014 | Nakaya | H03K 19/01859 326/41 |
| 2015/0052092 | A1 | 2/2015 | Tang | |
| 2015/0188519 | A1* | 7/2015 | Singhal | H03K 19/0013 327/199 |
| 2015/0206051 | A1* | 7/2015 | McIntosh | G06N 3/049 706/15 |

FOREIGN PATENT DOCUMENTS

| | | |
|---|---|---|
| JP | 7262159 A | 10/1995 |
| JP | 11-212953 A | 8/1999 |
| JP | 11-212954 A | 8/1999 |

OTHER PUBLICATIONS

Chen, Luonan et al., "Chaotic Simulated Annealing by a Neural Network Model with Transient Chaos", Neural Networks, vol. 8, No. 6, pp. 915-930, 1995.
Diaz-Mendez, A. et al., "Chaotic noise MOS generator based on logistic map", Microelectronics Journal 40 (2009) 638-640, available online Jul. 24, 2008.
Lopez-Hernandez, J. et al., "A current mode CMOS noise generator using multiple Bernoulli maps", Microelectronic Engineering 90 (2012) 163-167, available online May 10, 2011.
Cruz, Jose M. et al., "A CMOS IC Nonlinear Resistor for Chua's Circuit", IEEE Transactions on Circuits and Systems—I: Fundamental Theory and Applications, vol. 39, No. 12, Dec. 1992, pp. 985-995.
Delgado-Restituto, Manuel et al., "Integrated Chaos Generators", Proceedings of the IEEE, vol. 90, No. 5, May 2002, pp. 747-767.
Mandal, Soumyajit et al., "Analysis and CMOS Implementation of a Chaos-Based Communication System", IEEE Transactions on Circuits and Systems—I: Regular Papers, vol. 51, No. 9, Sep. 2004, pp. 1708-1722.
Li, Yang et al., "Simulated Annealing with Probabilistic Neighborhood for Traveling Salesman Problems", 2011 Seventh International Conference on Natural Computation, pp. 1565-1569, Jul. 2011.
Bak, Per et al., "Self-Organized Criticality: An Explanation of 1/f Noise", Physical Review Letters, vol. 59, No. 4, Jul. 27, 1987, pp. 381-384.
Brunnet, Leonardo et al., "Long-range order with local chaos in lattices of diffusively coupled ODEs", Physica D 78 (1994) 141-154.
Kirkpatrick, S. et al., "Optimization by Simulated Annealing", Science, New Series, vol. 220, No. 4598, May 13, 1983, pp. 671-680.
Kennedy, Michael Peter, "Robust OP Amp Realization of Chua's Circuit", Frequenz, vol. 46, No. 3-4, Mar.-Apr. 1992, pp. 66-80.
Zhou, Chang-song et al., Chaotic annealing for optimization, Physical Review E, vol. 55, No. 3, Mar. 1996, p. 2580-2587.
Dickman, Ronald et al., "Self-organized criticality as an absorbing-state phase transition", Physical Review E, vol. 57, No. 5, May 1998, pp. 5095-5105.
Reeves, Colin R., "A Genetic Algorithm for Flowshop Sequencing", Computers and Operations Research, (1995), 22, 5-13 (12 pages).
Li, YuanXian et al., "A New Dynamical Evolutionary Algorithm Based on Statistical Mechanics", J. Comput. Sci. & Technol., May 2003, vol. 18, No. 3, pp. 361-368.
Elhaddad, Younis R., "Combined Simulated Annealing and Genetic Algorithm to Solve Optimization Problem", World Academy of Science, Engineering and Technology, 68, 2012, pp. 1508-1510.
Nair, T. R. Gopalakrishnam et al., "Comparison of Genetic Algorithm and Simulated Annealing Technique for Optimal Path Selection in Network Routing", NCVN-09 Oct. 9-10, 2009 KCG College of Technology, 6 pages.
Storn, Rainer et al., "Differential Evolution—A Simple and Efficient Heuristic for Global Optimization over Continuous Spaces", Journal of Global Optimization 11: 341-359, 1997.
Manikas, Theodore W. et al., "Genetic Algorithms vs. Simulated Annealing: A Comparison of Approaches for Solving the Circuit Partitioning Problem", Department of Electrical Engineering, The University of Pittsburgh, Technical Report 96-101, May 1996, 16 pages.
Zhou, Yuyu et al., "Hybrid Genetic Algorithm with Simulated Annealing based on Best-Fit Strategy for Rectangular Packing Problem", Advanced Materials Research vols. 118-120 (2010) pp. 379-383.
Corana, A. et al., "Minimizing Multimodal Functions of Continuous Variables with the 'Simulated Annealing' Algorithm", ACM Transactions on Mathematical Software, vol. 13, No. 3, Sep. 1987, pp. 262-280.
Zhang, Jingyu et al., "Models and hybrid algorithms for inverse minimum spanning tree problem with stochastic edge weights", World Journal of Modeling and Simulation, vol. 2 (2006) No. 5, pp. 297-311.
Zhou, Aimin et al., "Multiobjective evolutionary algorithms: A survey of the state of the art", Swarm and Evolutionary Computation 1 (2011) 32-49, published online Mar. 16, 2011.
Atsalakis, George et al., "Simulating annealing and neural networks for chaotic time series forecasting", Chaotic Modeling and Simulation (CMSIM) 1: 81-90, 2012.
Mahfoud, Samir W., "Parallel recombinative simulated annealing: A genetic algorithm", Parallel Computing, vol. 21, Issue 1, Jan. 1995, pp. 1-28 (Abstract Only).
Kurbel, K. et al., "Solving optimization problems by parallel recombinative simulated annealing on a parallel computer—an application to standard cell placement in VLSI design", IEEE Trans Syst Man Cybem B Cybern. 1998; 28(3): 454-61 (Abstract Only).
Suman, Brian et al., "A survey of simulated annealing as a tool for single and multiobjective optimization", Journal of the Operational Research Society, Oct. 2006, vol. 57, Issue 10, pp. 1143-1160, published online Oct. 19, 2005.

* cited by examiner

SELF-ORGANIZED CRITICAL CMOS CIRCUITS AND METHODS FOR COMPUTATION AND INFORMATION PROCESSING

CROSS-REFERENCE TO RELATED APPLICATIONS

This application is a 35 U.S.C. § 111(a) continuation of PCT international application number PCT/US2015/030195 filed on May 11, 2015, incorporated herein by reference in its entirety, which claims priority to, and the benefit of, U.S. provisional patent application Ser. No. 61/991,572 filed on May 11, 2014, incorporated herein by reference in its entirety. Priority is claimed to each of the foregoing applications.

The above-referenced PCT international application was published as PCT International Publication No. WO 2015/175427 on Nov. 19, 2015, which publication is incorporated herein by reference in its entirety.

STATEMENT REGARDING FEDERALLY SPONSORED RESEARCH OR DEVELOPMENT

This invention was made with Government support under DGE0903720, awarded by the National Science Foundation. The Government has certain rights in the invention.

INCORPORATION-BY-REFERENCE OF COMPUTER PROGRAM APPENDIX

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND

1. Technological Field

This technical disclosure pertains generally to self-organized computation and information devices, and more particularly to a chaotic circuit having a matrix of oscillator unit cells interconnected with transmission gates configured to be driven from the Markovian dynamics regime into the chaotic dynamics regime in solving a problem.

2. Background Discussion

Conventional computers solve sequential arithmetic problems efficiently, however, they are inefficient in solving large problems that have many interacting variables. In most cases the exact analytical solutions do not exist. In addition, the computational effort for finding the right solutions is often non-deterministic polynomial-time hard (NP-hard) for conventional computers. Conventional computers employ the von Neumann architecture in which data are moved in and out of the central processing unit (CPU). In this architecture, calculations are preformed sequentially, which make it inefficient in solving large interactive problems.

Computers are being increasingly tasked with solving complicated tasks, such as recognizing images, modeling physical systems, and optimizing large systems. Many of these problems are NP-hard and sometimes impossible to solve using conventional computers.

Accordingly, a need exists for new computer architectures for handling problems involving large numbers of interacting variables. The present disclosure fulfills that need and overcomes additional shortcomings of existing systems.

BRIEF SUMMARY

A circuit having a matrix of identical elements, or "unit cells", is disclosed in which each unit cell comprises an oscillator, such as a plurality of inverters connected in series, or other form of oscillator circuit. Each unit cell sets a voltage, referred to as a bit, in the matrix. Each bit is coupled with the neighboring bits with transmission gates. The circuit is capable of generating a matrix of random bits at once. These bits are used to represent a particular solution to the problem of interest.

By controlling the bifurcation parameters of the circuit, it is possible to drive the circuit from the Markovian dynamics regime into the chaotic dynamics regime. It should be appreciated that a "bifurcation" occurs when a small change made to a parameter value (bifurcation parameter) of a system results in a sudden 'qualitative' or topological change in its behavior. The boundary between the two regimes of Markovian dynamics regime and chaotic dynamics regime is referred to as "self-organized criticality (SOCr)." This boundary can be extended to a phase when noise is present. Any real world dynamic system has noise; therefore, the self-organized critical phase has a finite width, which is proportional to the amount of noise in the system. It has been well studied that self-organized critical systems exhibit a power law probability distribution in which small rearrangements of the system happen more frequently than large rearrangements. At self-organized criticality, the present circuit will constantly reconfigure itself into many different meta-stable states. More specifically, the circuit will constantly generate different arrangements of bits that represent solutions to the problem of interest, thereby allowing the circuit to be utilized for information processing.

The circuit can be used to implement chaotic annealing algorithms and to solve optimization problems. In one embodiment, the problem of interest is first implanted into the circuit by setting the connection strengths between the unit cells (i.e., setting different gate voltages for the transmission gates). By setting different connection strengths, the circuit will have an energy landscape that matches the problem of interest. Many problems can be mapped to optimization problems. In optimization, the task is to find the global minimum. The circuit is initialized in the chaotic regime, then it is slowly driven away from the chaotic regime, through the self-organized critical phase and finally into the Markovian regime by tuning its bifurcation parameters. The circuit will switch between different configurations of voltages during this process. These voltages are continuously read out with data latches or analog to digital converters and record the matrix of bits as the solutions, and the system tracks the solutions with the lowest cost. As the circuit moves away from the chaotic regime, it will converge to the global minimum with high probability. Alternatively, instead of implementing the objective function in the circuit, the cost of the solutions can be determined using a computer which is configured to drive the circuit according to the determined cost. The circuit is initialized in the self-organized critical regime and solutions are continuously read out. If the cost of the current solution is high, then bifurcation parameters are modified to make the circuit closer to chaos. If the cost is low, then bifurcation parameters are changed to make it closer to the Markovian regime. The system terminates when the cost is low enough or a threshold is reached on the allowed time.

Further aspects of the presented technology will be brought out in the following portions of the specification, wherein the detailed description is for the purpose of fully disclosing preferred embodiments of the technology without placing limitations thereon.

BRIEF DESCRIPTION OF THE SEVERAL VIEWS OF THE DRAWING(S)

The disclosed technology will be more fully understood by reference to the following drawings which are for illustrative purposes only:

DETAILED DESCRIPTION

Various annealing methods have been investigated for solving problems on large systems. These methods include simulated annealing (SA) and chaotic annealing (CA). The inspiration of annealing computation comes from the phenomenon that physical systems tend to converge to the minimum energy state when temperature is slowly reduced.

Simulated annealing (SA) is a software methodology that represents the problem by an objective function. It finds the global minimum by trying out different solutions. The solutions are modified based on the current "temperature". The SA approach has a wide range of applications, such as improving speed and quality of VLSI circuit placement, organizing communication network in order to achieve the minimum cost, and so forth. Most SA algorithms are implemented in software using conventional computers.

Chaotic annealing (CA) is similar to simulated annealing. However, instead of changing the temperature of the system, it slowly moves the system from the chaotic regime to the Markovian (non-chaotic) regime. In this process, the system converges to the global minimum energy state with high probability. Both SA and CA are usually implemented in software; as a result, their speeds are substantially limited by the sequential nature of the computer architecture.

In the following disclosure, a chaotic circuit lattice (matrix) is disclosed which refers to a "node" as a connection point, which is a common understanding (e.g., a set of wires directly connected together in a circuit). When a node in the circuit is referred to as being "high," its voltage is in the range of logical one, or equivalently, is close to the supply voltage, $V_{DD}$. It will be understood that when a node in the circuit is referred to as being "low," its voltage is in the range of logical zero, or equivalently, close to the ground voltage, $V_{GND}$.

Figure 1:
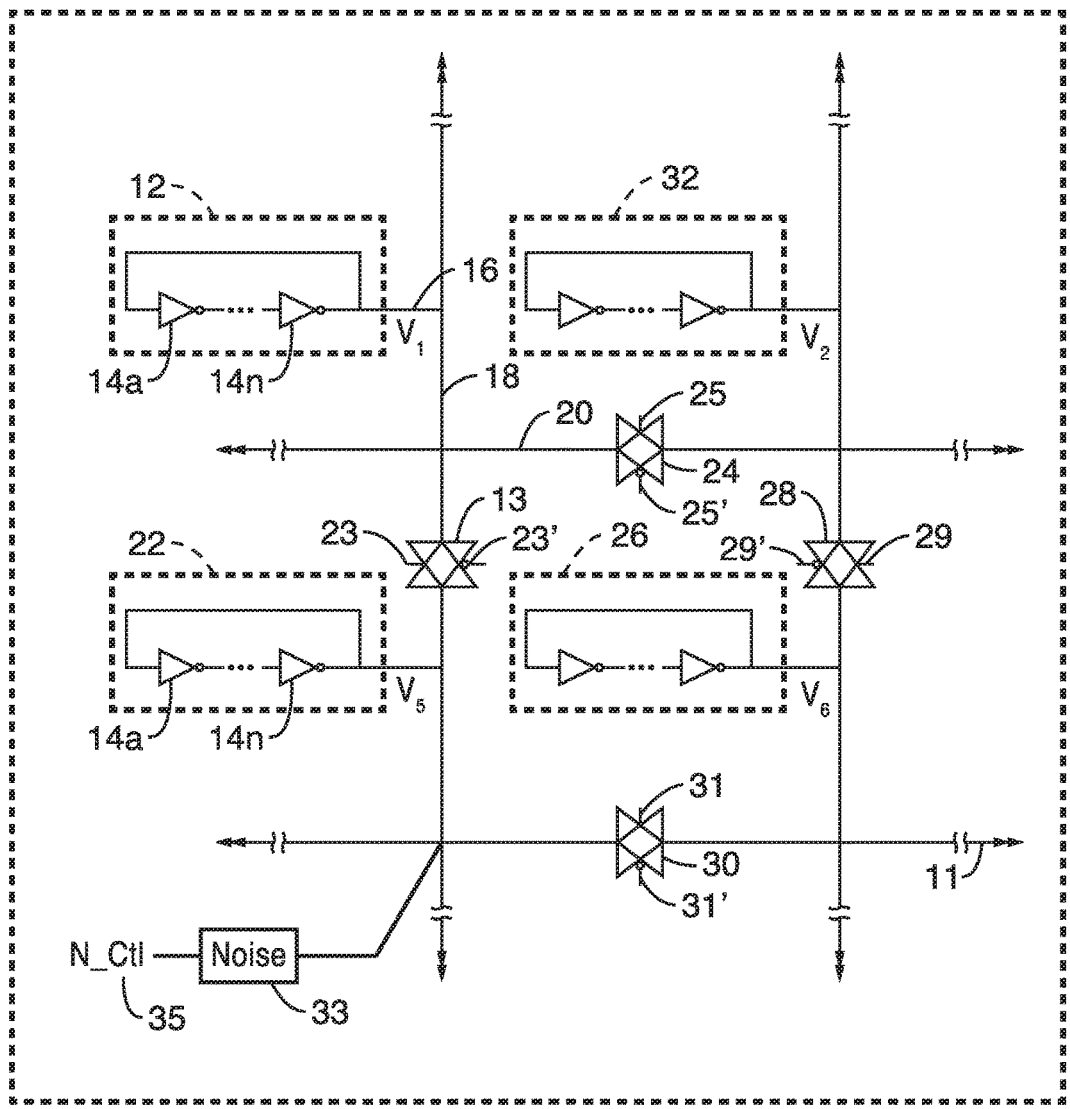
FIG. 1 is a schematic diagram of an embodiment of a chaotic CMOS circuit according to an embodiment of the present disclosure, showing a unit cell.

FIG. 1 illustrates an example embodiment 10 of a chaotic circuit, primarily showing the interconnection about a few unit cells. Each unit cell comprises a circuit configured to generate a voltage level 16 on the node of the lattice circuit to which it is attached, such as having a vertical 18 and horizontal 20 interconnections. At least one embodiment of unit cell is configured for receiving a bifurcation parameter for selecting whether the unit cell operates in an oscillator mode, or a steady state output mode. Since described implementations of the unit cells comprise an oscillator circuit, that in some embodiments have selectable stages, it is often referred to herein as oscillator. However, it should be appreciated that the unit cell can be implemented with a variety of circuits which generate state variables into the lattice formation of the chaos circuit.

A unit cell 12 is seen, which is shown by way of example and not limitation having an oscillator circuit configuration, comprising multiple inverters 14a through 14n connected in series. Unit cell 12 sets a voltage at $V_1$. Similarly, unit cell 32 sets a voltage at $V_2$, unit cell 22 sets a voltage at $V_5$, and unit cell 26 sets a voltage at $V_6$. These four voltages, $V_1$, $V_2$, $V_5$, and $V_6$, are coupled to each other through transmission gates 13, 24, 28 and 30. The connection strengths can be controlled by changing the voltage applied at control inputs 23, 25, 29, 31, respectively, along with their complementary signals 23', 25', 29' and 31', on the transmission gates. Thus, the circuit is seen configured with a lattice structure, comprising a matrix of unit cells interconnected by transmission gates. Arrows near the border of FIG. 1, such as 11, represent connections to adjacent cells. An optional noise source 33, with noise control signal (N_Ctl) 35, is shown coupled to the matrix of unit cells for increasing the duration of SOCr.

Figure 2:
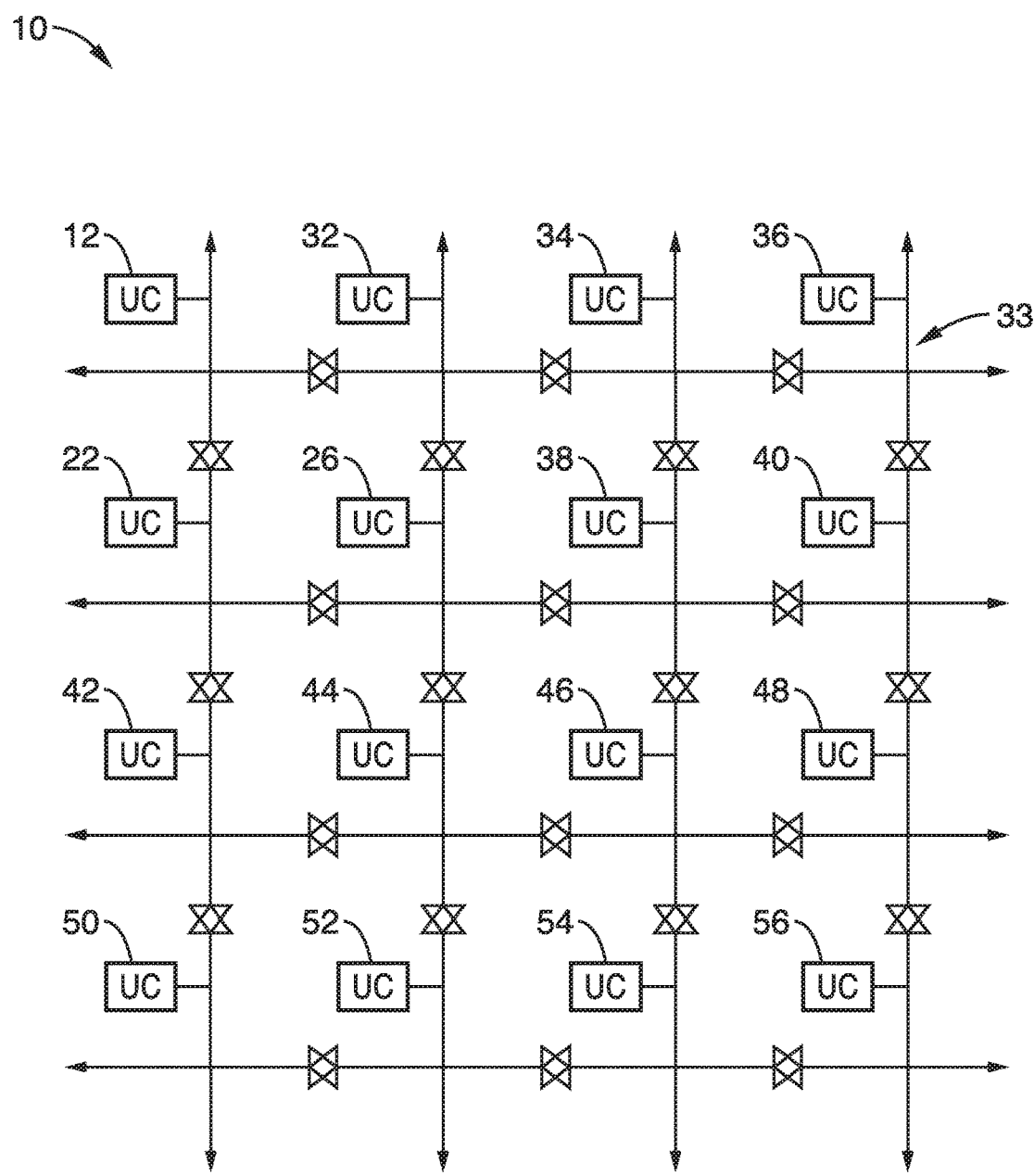
FIG. 2 is a block diagram of multiple cells of the chaotic system, shown interconnected according to an embodiment of the present disclosure.

FIG. 2 illustrates the embodiment 10 showing a larger portion of the matrix than was shown in FIG. 1. In this example, unit cells 12, 22, 26, 32, 34, 36, 38, 40, 42, 44, 46, 48, 50, 52, 54, 56 are all seen. The typical size for the matrix should be on the order of 100 by 100 unit cells. The minimum size having practical use would be at least 3 by 3, with the size of the matrix being preferably greater than 9 unit cells, and more preferably greater than 10,000 unit cells. It should be appreciated that the circuit can be extended to obtain more bits by simply repeating the same lattice structure. In addition, the lattice may be implemented with various shapes, such as rectangular, hexagonal, pentagonal, triangular, and other lattice shapes or combinations thereof. The interconnections need not follow a rectangular row and column arrangement either, but also may be directed in various interconnecting patterns. There can be any desired number of connections between the adjacent unit cells. Furthermore, the lattice structure may be extended to beyond the planar (2D) structure, such as into a three dimensional (3D) structure.

Figure 3:
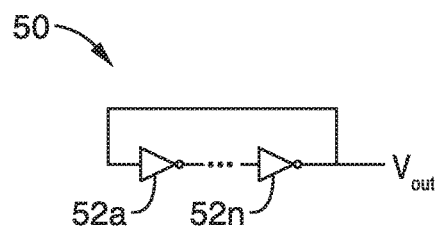
FIG. 3 through FIG. 8 are schematics of different unit cell configurations according to embodiments of the present disclosure.
Figure 4:
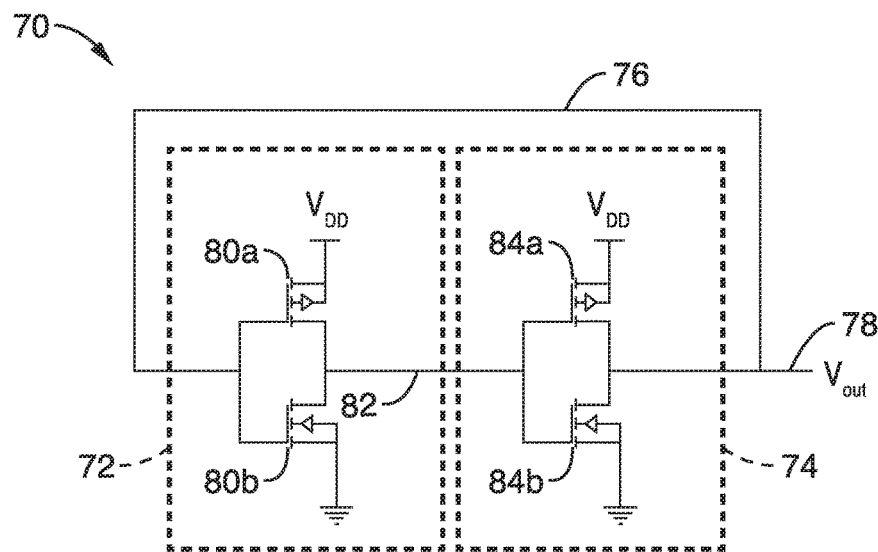

FIG. 3 through FIG. 8 illustrate example embodiments of unit cells. In FIG. 3 an example embodiment 50 of a unit cell block diagram is seen containing any desired number of inverters 52a, . . . 52n in series. In FIG. 4 is seen a schematic embodiment 70 showing a transistor-level implementation of an example unit cell having two inverters connected in series. Transistor circuits are shown for two series inverters, with a first inverter 72 comprising a column (stack, totem-pole) of transistors 80a, 80b (which are complementary NMOS and PMOS transistors), whose output 82 is coupled to a second inverter 74 having a totem-pole configuration of complementary transistors 84a, 84b, with output 78. A feedback path 76 is seen between output 78 of the second inverter back to the input of the first inverter. This configuration has two stable states. The first stable state is when the voltage at the connection between the two inverters 82 is high, and the voltage at the connection between the two inverters through the outer loop 76 is low. The second stable state is when the voltage at the connection between the two inverters 82 is low, and the voltage at the connection between the two inverters through the outer loop 76 is high.

Figure 5:
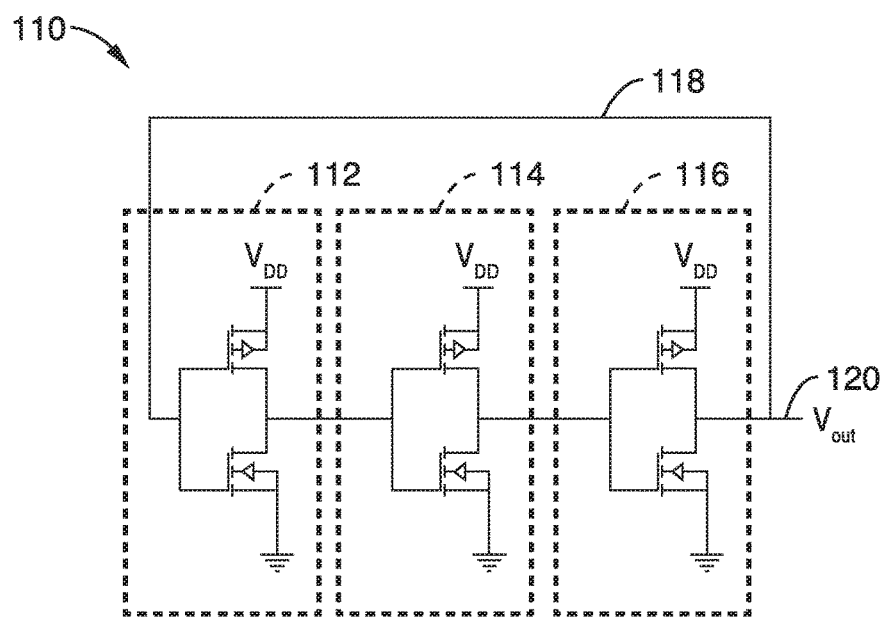

In FIG. 5 an example embodiment 110 is shown of a unit cell having three inverters 112, 114, and 116 connected in series. As each inverter has the same totem-pole of complementary transistors, the transistors were not labeled. This configuration forms a ring oscillator in which $V_{out}$ 120 will oscillate between low and high, with feedback path 118 to the input of inverter 112.

Figure 6:
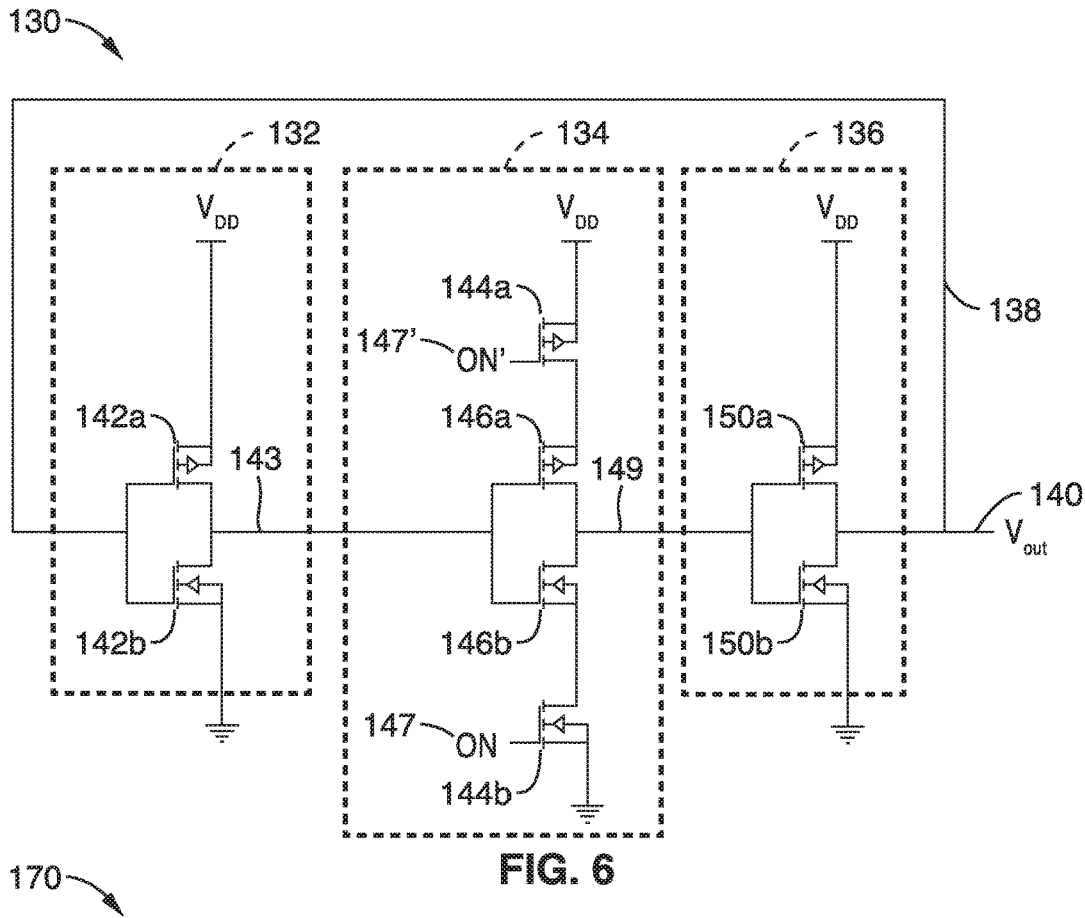

FIG. 6 illustrates an example embodiment 130 of a unit cell which is configured as a ring oscillator having three series inverters 132, 134, 136, with feedback path 138 coupling between output 140 and input to the first inverter 132. Inverter 132 is shown with transistor totem-pole 142a, 142b and output 143 coupled to inverter 134 having a double totem-pole configuration with a first pair of complementary transistors 146a, 146b, which are bordered by transistors 144a, 144b, which are switched by complementary signals 147 (ON), 147' (ON'). Output 149 couples inverter 134 to inverter 136, which itself comprises a single totem-pole stage with transistors 150a, 150b. Although the circuit is similar to that in FIG. 5, it has been seen that one of the inverters can be turned On and Off by controlling transistors 144a, 144b. The complementary signals 147 (ON), 147' (ON') control the extent to which transistors 144a, 144b are activated (turned on), respectively, thus changing the resistance through the transmission gate. It will be appreciated that ON' is the complementary signal to ON. When the ON signal is high, the middle inverter is active. Therefore, the unit cell will behave like an oscillator similar to the one shown in FIG. 5. On the other hand, when the ON signal is low, the middle inverter is inactive, so that the unit cell will stop oscillating.

Figure 7:
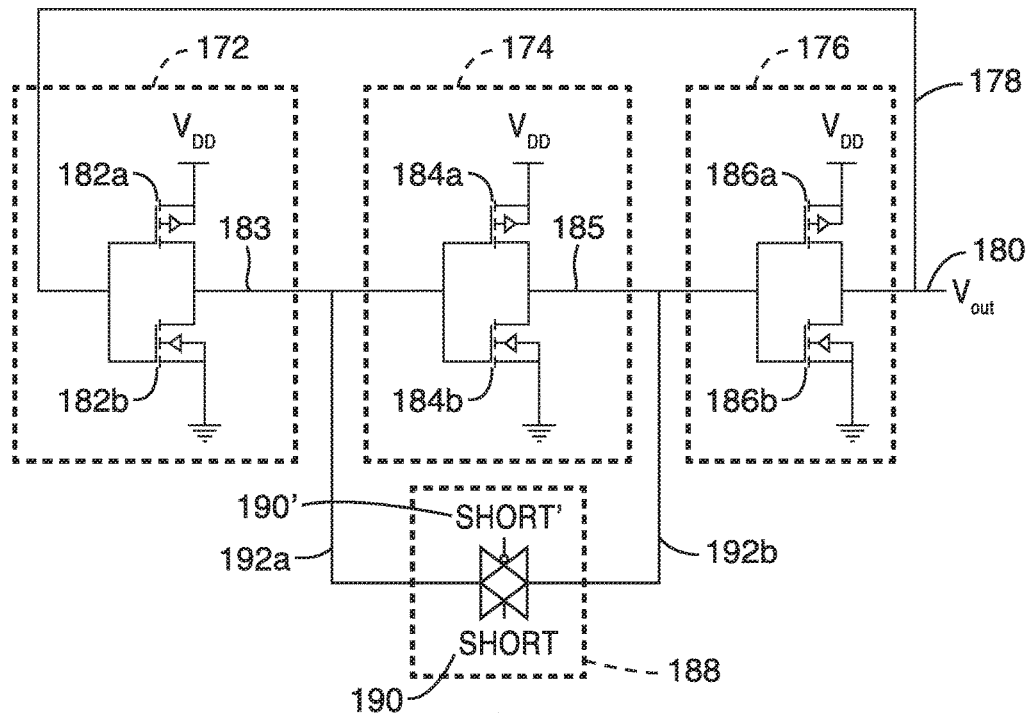

In FIG. 7 an example embodiment 170 of a unit cell having inverters 172, 174, 176, with output 180 is seen feeding back a signal 178 to the input of the oscillator chain. Inverter 172 has totem-pole transistors 182a, 182b with output 183 coupled to inverter 174 with totem-pole transistors 184a, 184b and output 185, coupled to inverter 176 with totem-pole transistors 186a, 186b. The circuit in this figure is an alternative implementation of the one shown in FIG. 6. In this example, one of the inverters can be shorted by turning on an internal transmission gate 188 (e.g., as seen in FIG. 4). The transmission gate is turned on when the SHORT signal 190 is high and the SHORT' signal 190' is low. SHORT' is the complementary signal to SHORT. Similar to the unit cell shown in FIG. 6, when one of the inverters is shorted, the unit cell contains only two inverters. Thus, the unit cell has two stable states. Nevertheless, when the said inverter is not shorted, the unit cell will produce an oscillating output voltage.

Figure 8:
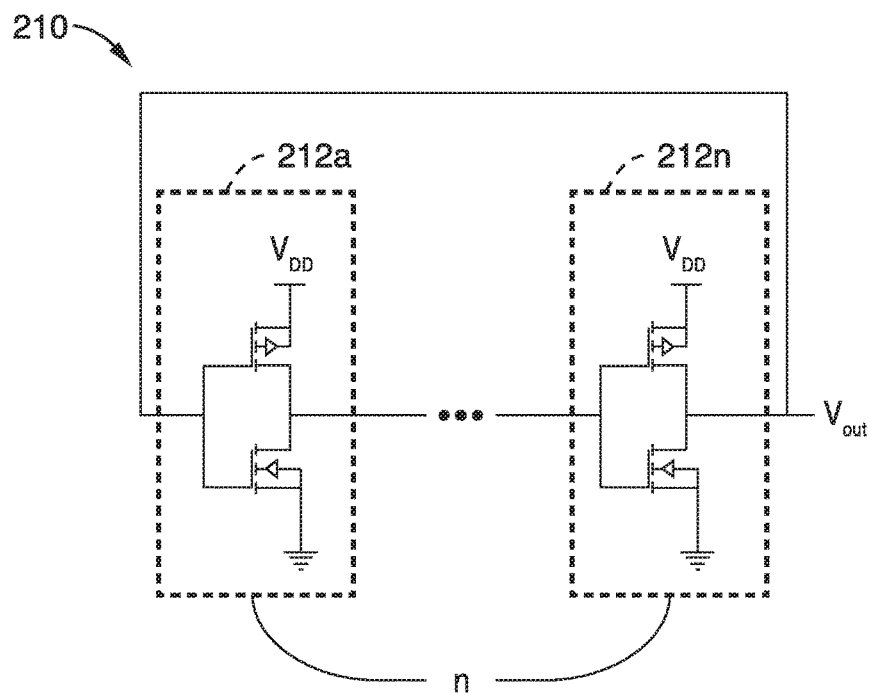

FIG. 8 illustrates an example embodiment 210 having a unit cell comprising "n" number of inverters in series, seen as inverters 212a through 212n. As each inverter is the same as seen in other figures, the transistors in this embodiment are not labeled.

In regard to these unit cell embodiments, it will be noted that some of the inverters can be turned off or shorted as demonstrated in FIG. 6 and FIG. 7. The circuit of FIG. 1 has a matrix of unit cells, and may contain any combination of the unit cells from FIG. 4 through FIG. 8, and combinations thereof, which can also be replaced by other circuits, such as a Chua's oscillator, or any other oscillator circuit known in the art.

It should be appreciated that the matrix may comprise a mix of different types of unit cells. According to the problem that the user aims to solve, different unit cells can be used to better model the optimization problem and to potentially reduce computation time. For example, unit cells with stable outputs such as the one in FIG. 4 can be utilized to model a passive variable in the optimization problem that changes its state depending on the value of its neighbors, as compared to the active one in FIG. 5 that drives oscillations.

It will be noted that unit cells in FIG. 4, FIG. 5, and FIG. 8 do not have bifurcation parameter control for receiving a bifurcation parameter for selecting whether the unit cell operates in an oscillator mode, or a steady state output mode. As mentioned above, a chaos matrix may have different unit cell types, or all unit cells could be configured with bifurcation control to be used only as desired. In configurations where the lattice only contains unit cells that do not have bifurcation control, the transmissions gates linking the adjacent nodes are utilized as a bifurcation control. However, using the transmission gates in this manner can interfere with the ability to implant the objective function on the chaos circuit using these transmission gates according to Method 1 (seen in FIG. 14). Hence, having no bifurcation control at the unit cell level is not preferred for Method 1.

However, the lack of unit cell bifurcation control in Methods 2 and 3 does not pose the same difficulty because it is possible to achieve bifurcation control via the transmission gate.

Figure 9:
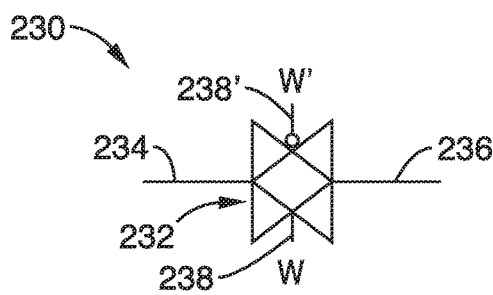
FIG. 9 through FIG. 12 are schematics of transmission gate elements according to embodiments of the present disclosure.
Figure 10:
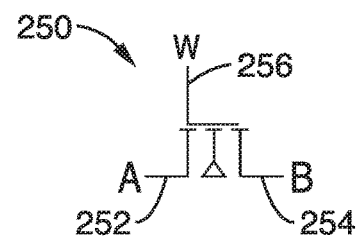
Figure 11:
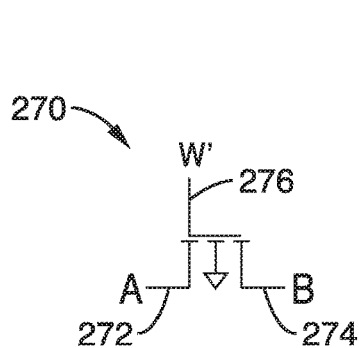
Figure 12:
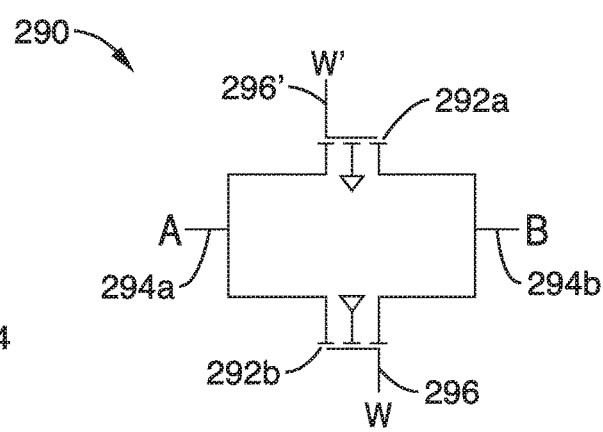

FIG. 9 through FIG. 12 illustrate embodiments of a transmission gate, such as 12, 22, 26 and 32, shown in FIG. 1. FIG. 9 shows the symbolic representation of a transmission gate 230 seen with bidirectional circuit 232 having two signal input/output (I/O) 234 (A), 236 (B), and a control input as the voltage applied between inputs 238 (W), 238' (W). The resistance exhibited between terminal A and terminal B depends on the voltage applied to control inputs W and W', with W being the complementary signal to W. In FIG. 10 through FIG. 12, three different realizations of this transmission gate are depicted. In FIG. 10 is seen an embodiment 250 of a transmission gate utilizing a single active device, exemplified as an N-type metal-oxide-semiconductor (NMOS) transistor, having I/O 252, 254, with a single control 256 (W) which controls the resistance between terminal A and terminal B, while a signal W is not used. Similarly in FIG. 11 an embodiment 270 is seen of another single active element transmission gate exemplified with a P type metal-oxide-semiconductor (PMOS) transistor having I/O 272, 274 with control 276 (W'), while signal W is not used. In FIG. 12, an example embodiment 290 of a multiple active element transmission gate is shown exemplified using a combination of an PMOS transistor 292a and an NMOS transistor 292b, with I/O 294a, 294b, and control signals 296, 296'. In solving certain problems, the transmission gates may be operating according to the disclosure by operating W and W of the transmission gate (e.g., FIG. 9 and FIG. 12) in a non-complementary manner to create a voltage limit on how much the two terminals A and B can affect each other. The above transmission gates are described by way of example and not limitation, as one of ordinary skill in the art will recognize that numerous other forms of devices used singularly and in combination provide a means for controlling transmission between I/O A to B, and B to A, in response to the magnitude of a control signal. It will be appreciated, therefore, that the circuit in FIG. 1 may be implemented utilizing any of the transmission gates illustrated in FIG. 9 through FIG. 12, or any other means in which an input signal can control transmission between two sides of a transmission gate.

Referring back to FIG. 1, it will be recognized that voltages at the major intersections, such as $V_1$, $V_2$, $V_5$, $V_6$ in FIG. 1 form a matrix of bits that represents a solution to the problem of interest. In order to read out these voltages, an external array of data latches is connected to them. The array of data latches has its own clock cycle. For each clock cycle, these voltages are digitized and recorded as individual bits. It should be noted that the D input to a data latch is like a 1 bit analog to digital converter, in that upon receiving a clock input, a "1" bit is stored in the latch if the input voltage is above a threshold, otherwise a "0" bit is stored. In at least one embodiment, the data latches can be replaced by analog-to-digital converters (ADCs), or other circuits which provide for converting between analog voltage levels and digital data.

Figure 13:
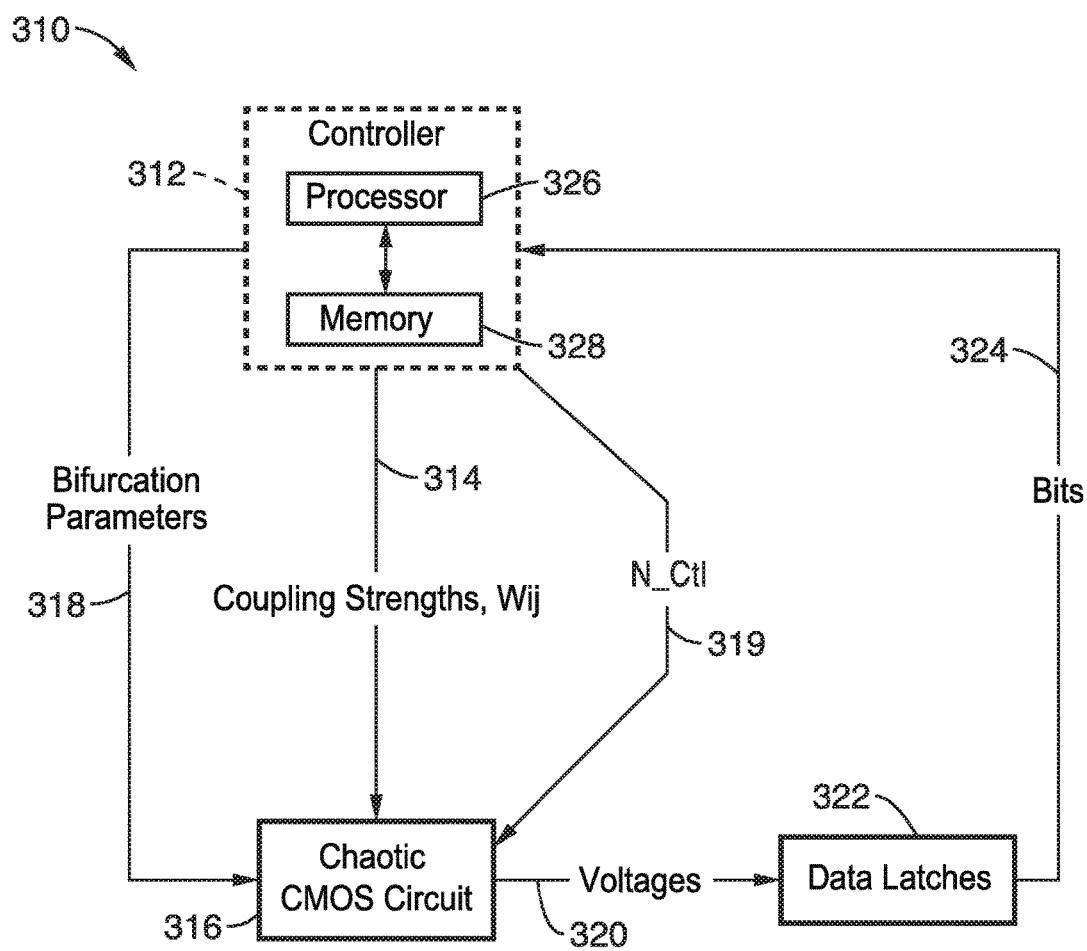
FIG. 13 is a block diagram of the interconnections to the chaotic system matrix according to an embodiment of the present disclosure.

FIG. 13 illustrates an example embodiment 310 for the chaotic system showing control of the chaotic matrix (lattice) and data collection from the chaotic matrix. A controller circuit (e.g., processor) 312 is seen for outputting coupling strengths ($W_{ij}$), and bifurcation parameters 318 to the chaotic circuit matrix 316. Modifying of the coupling strengths provides for implanting the objective function derived from the problem of interest into the circuit. Adjustment of bifurcation parameters by the controller provides for electrically driving chaotic CMOS circuit 316 to the chaotic regime, and for slowly changing bifurcation parameters 318 to drive chaotic circuit 316 away from the chaotic regime. An example of the bifurcation parameters that the controller 312 can adjust is the ON signal or the SHORT signal seen in FIG. 6 and FIG. 7, respectively. Additionally, controller 312 is shown configured for controlling an optional noise source 33 as seen in FIG. 1, such as through signal N_Ctl 35.

Voltage outputs 320 from chaotic matrix 316 are digitized and recorded by data latches 322, and output 324 as communication to controller 312. The matrix of bits on the data latches represents a solution to the problem of interest, which are interpreted by controller 312 which also determines the objective function for the current solution, and records the value of the lowest objective function and the associated solution. The objective function value will also be referred to as the cost of a solution. It should be appreciated that the controller circuit 312 may be implemented with a wide variety of digital control circuitry. In at least one embodiment, controller 312 is configured with a processor 326, and memory 328, so that instructions retained in memory 328 can be executed by processor 326 in carrying out various steps in the control of the matrix as well as readback and processing functions of the state variables found therein. It should be appreciated that processor 326 may include, but is not limited to, one or more of the following: microprocessors, microcontrollers, central processing units (CPUs), system on chip (SOC), application-specific integrated circuits (ASICs), field programmable gate arrays (FPGAs), computers, other computational and control circuits, and combinations thereof. By way of example and not limitation, controller 312 is configured for controlling coupling strengths 314, bifurcation parameters 318, and noise sources 319 in response to utilizing any desired forms of communicating these values. For example, in at least one embodiment, analog signals are generated by the controller for connection to the various unit cells, transmission gates, and optional noise sources. In at least another embodiment these signals may be output as digital signals, such as through a digital protocol (e.g., universal serial bus (USB), which are converted to analog signals to drive these elements of the chaos circuit. The following methods illustrate process steps performed by processor 312 of FIG. 13 in solving an objective function.

Figure 14:
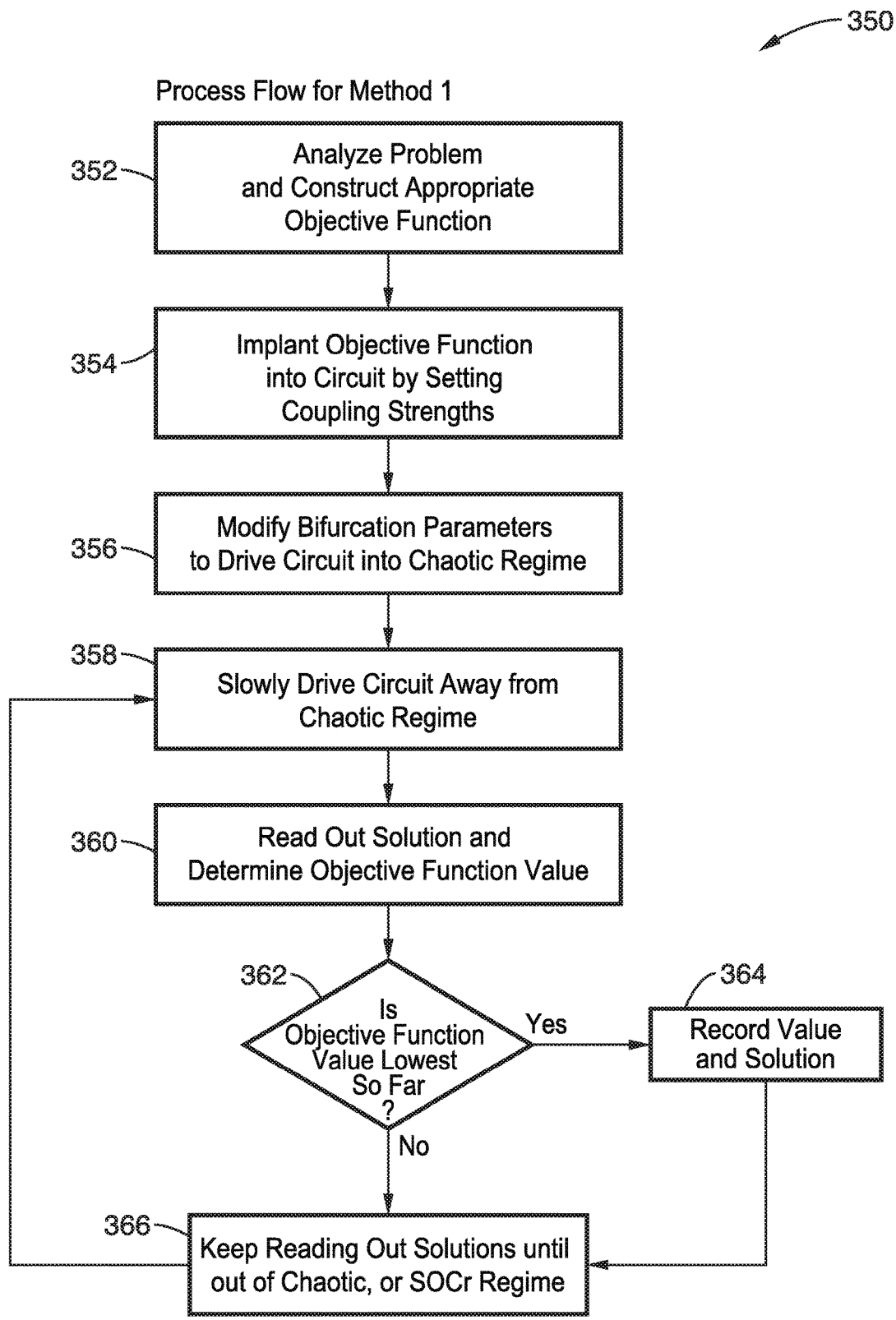
FIG. 14 is a flow diagram of process flow for a first method (Method 1) in solving the problem of interest using the chaotic CMOS circuit according to an embodiment of the invention.

FIG. 14 illustrates an example embodiment 350 of a problem solving Method 1. In step 352 the problem of interest is analyzed and an appropriate objective function is constructed. The objective function is then implanted 354 into the chaotic matrix by adjusting coupling strengths between the unit cells. The chaotic matrix is driven 356 into the chaotic regime by adjusting bifurcation parameters. During this step, the system is calibrated, so that the processor recognizes what values of the bifurcation parameters will make the circuit chaotic, self-organized critical, or Markovian. The system calibrates itself by performing statistics on the output data from the chaotic matrix. As an example, the system should have a power law relationship in its avalanche size statistics (e.g., the probability of occurrence versus number of bits that switch their polarity together) when it is in the self-organized critical phase. In general, the statistics will show distinctive features for each mode of operation (chaotic, self-organized critical, or Markovian). It should be appreciated that any other type of signal processing, analytical, or statistical techniques known in the art to identify the mode of operation can be used to replace the one described in Method 1, 2, and/or 3, without departing from the disclosure. It should be noted that calibration is performed identically on each of the three methods, although the flowcharts may depict it in greater or lesser detail. The point of calibration is to create a mapping between the modes of operation and bifurcation parameters. And the calibration should be done after the objective function is implanted in either the chaos circuit or in the software, or in both simultaneously.

Next, the matrix is slowly driven 358 out of the chaotic regime, with the processor sampling a plurality of bits coming from the chaotic matrix. These bits represent a particular solution to the problem of interest. The objective function value of this particular solution is determined 360. If the objective function is the lowest value so far 362, then this value is recorded 364 and the solution. Otherwise solutions are generated 366 until the circuit is out of the chaotic regime with execution returning to block 358. In block 362, if the objective function is not the lowest value, then execution continues to block 366 to continue reading out solutions from the matrix with execution then returning back up to block 358. It can be seen that block 358 through 366 are repeated until the circuit is completely out of the chaotic or the self-organized critical regime. Clearly, the procedure may vary in numerous ways to achieve the same objective without departing from the disclosure.

In addition, it is possible to increase the width of the self-organized critical phase by adding more noises to the chaotic matrix. This can be achieved by adding current or voltage noise sources to the chaotic matrix, such as optional noise source 33 seen in FIG. 1. The locations of the noise sources do not depend on the problem statement. As an example, one or more noise sources can be added at the intersections of the vertical and horizontal wires. The processor can control the width of the self-organized critical phase by changing the amplitude of these noises, such as through using a noise control signal (N_Ctl) 35.

Figure 15A:
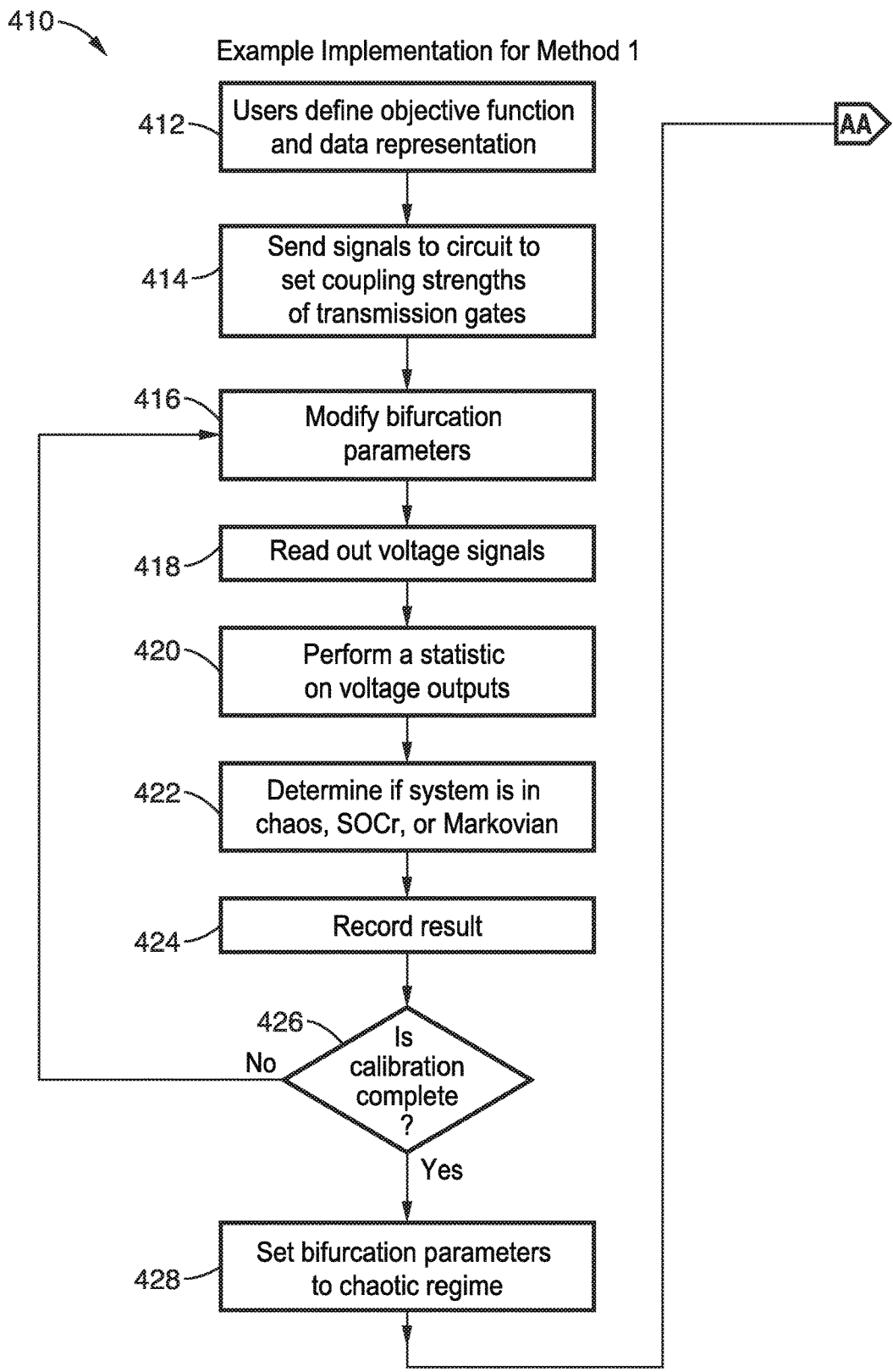
FIG. 15A and FIG. 15B are a flow diagram of the implementation process for the first method (Method 1) in solving the problem of interest using the chaotic CMOS circuit according to an embodiment of the invention.
Figure 15B:
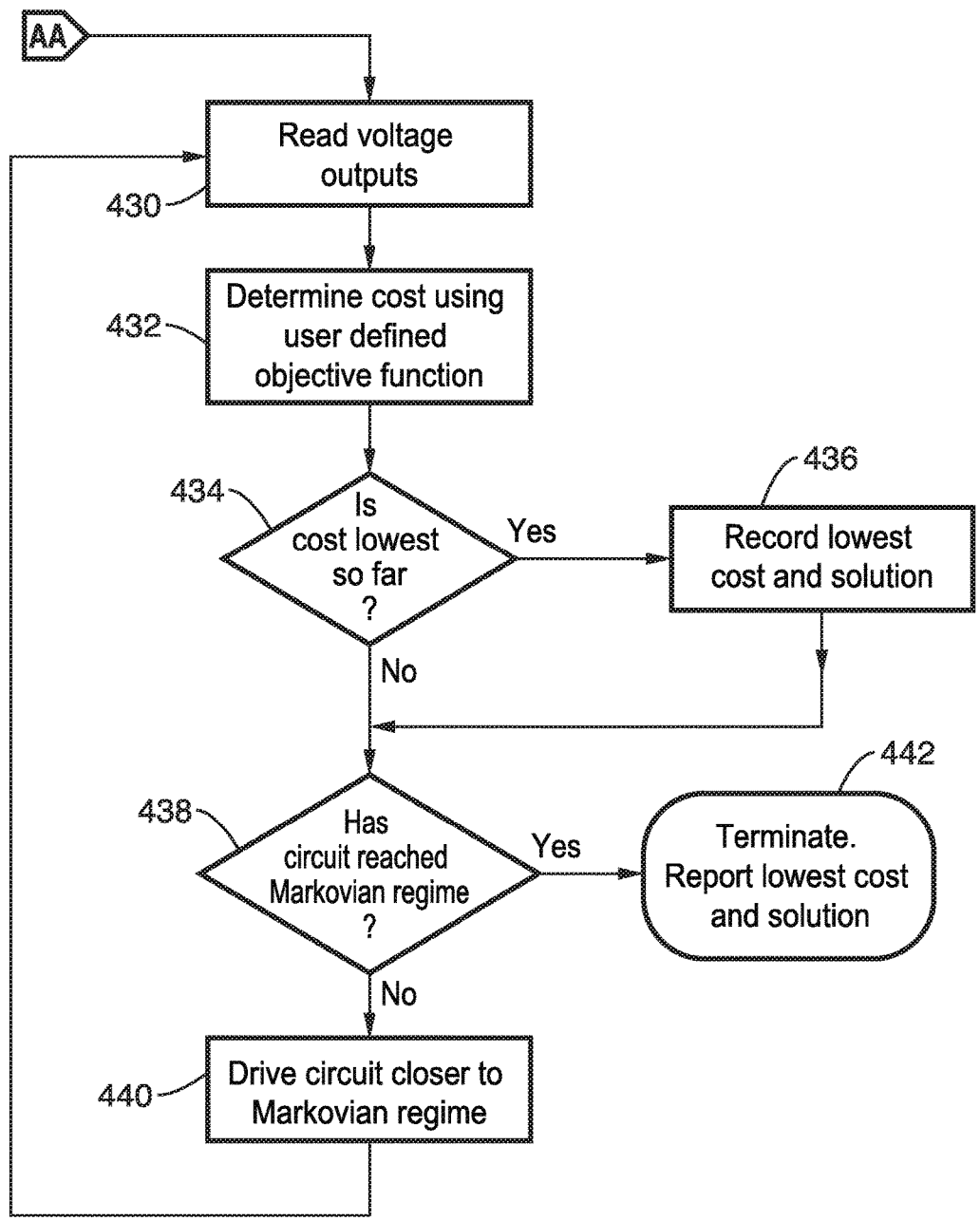

FIG. 15A and FIG. 15B illustrate an example embodiment 410 for implementing the programming used in Method 1 and executable on the processor. Users define objective function and data representation 412, with signals sent 414 to the chaotic matrix to set coupling strengths of the transmission gates in preparation for a calibration sequence (steps 416 through 426). During the calibration sequence, the mapping between the modes of the circuit (chaos, SOCr, or Markovian) and the corresponding bifurcation parameter settings is recorded. Because the transmission gates are set differently for each optimization problem, the mapping might change slightly. This mapping allows the system to control the modes of the chaos circuit more efficiently during the annealing operation. The calibration sequence includes blocks 416, 418, 420, 422, 424, and 426 in FIG. 15A. Bifurcation parameters are modified 416, after which voltage signals from the matrix are read out 418. Statistics are determined 410 on the voltage outputs after which a determination 422 is made if the system is in a chaos, SOCr, or Markovian mode. The results are recorded 424 in the bifurcation parameter mapping table after which a determination 426 is made if calibration is complete. The calibration is completed when enough bifurcation parameter mapping is recorded. The amount of required mapping depends on the desired accuracy level for the solution. The system will be able to make finer adjustment during the annealing operation if smaller step size is used in the mapping table. If it is not complete then execution moves from block 426 back to block 416 for another pass through the calibration loop. When calibration is complete, execution arrives at block 428 to set the bifurcation parameters to the chaotic regime. In block 430 voltage outputs are read from the matrix followed by determining 432 cost based on the user defined objective function. A check is made 434 for the lowest cost solution, if this is not the lowest cost, then execution proceeds to check if the matrix has reached 438 the Markovian regime. If the Markovian regime has not been reached, then the lattice is driven closer to the Markovian regime 440 and execution returns to block 430 for another pass. If the lowest cost is found in block 434, then the lowest cost and the solution are recorded 436, followed by performing the Markovian regime check 438. When the Markovian regime is determined 438 to be reached, then execution proceeds to block 442 with this processing terminated and the lowest cost and solution are reported.

As an alternative to driving the system out of the chaotic regime completely, as described in the preceding section, the system can be operated in a second way referred to herein as Method 2. In this second method, instead of implementing the objective function using the matrix circuit, the cost of these solutions is determined by conventional processing (e.g., an external computer processor configured for analyzing cost functions). If the current cost is high, the programming is configured to increase the energy drive or change the bifurcation parameter to make the matrix circuit closer to the chaotic regime, encouraging it to generate a very different solution. If the cost is low, the programming directs a decrease in the energy drive, but still maintains the system within the self-organized critical regime (SOCr), encouraging the system to fine-tune solutions locally in the solution space. The system continues to read out solutions and keeps track of the one with the lowest cost. The system will terminate when the cost is sufficiently low (below some selected threshold) or an allowed time factor criterion has been met.

Figure 16:
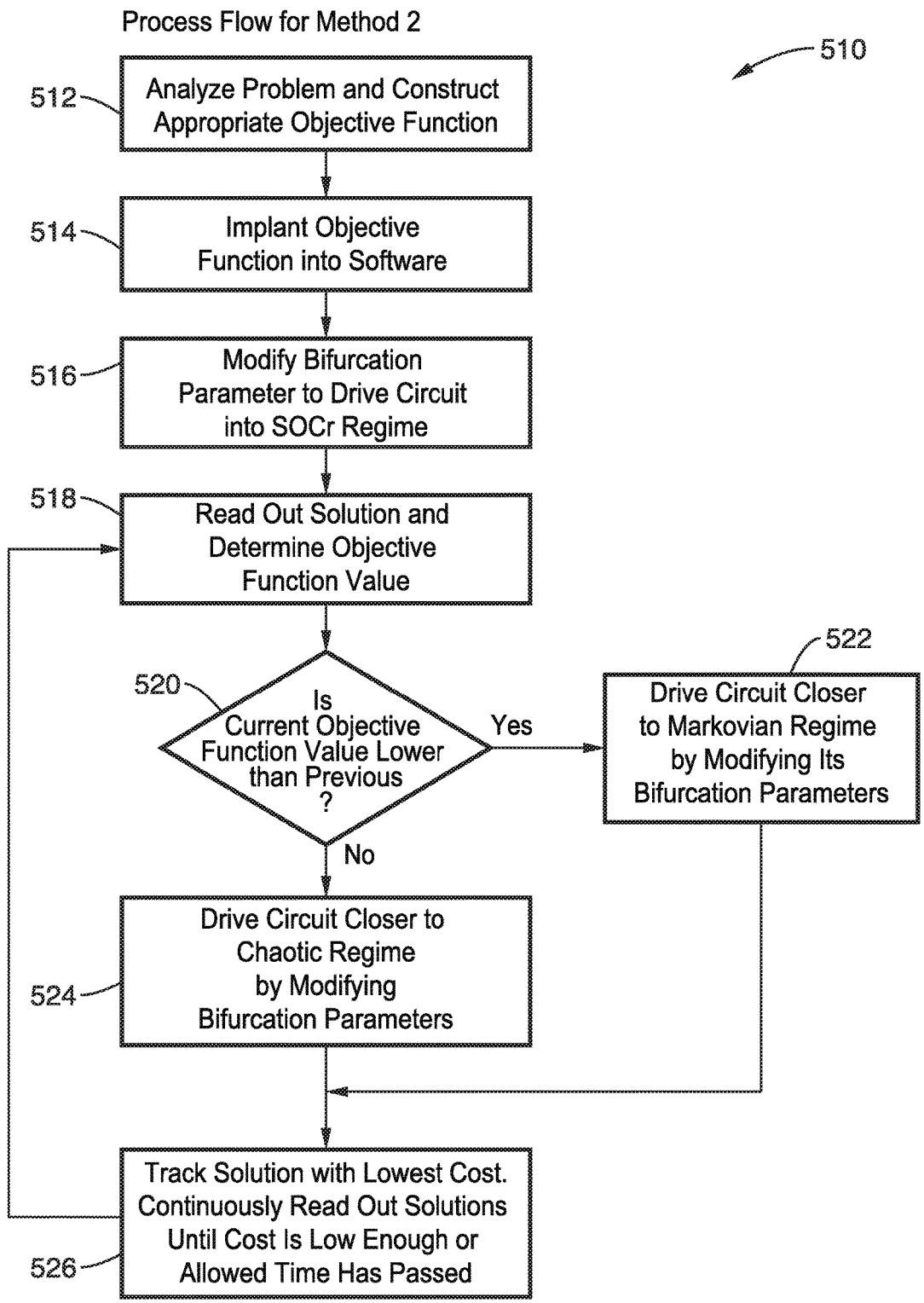
FIG. 16 is a flow diagram of process flow for a second method (Method 2) in solving the problem of interest using the chaotic CMOS circuit according to an embodiment of the invention.

FIG. 16 illustrates an example embodiment 510 of this Method 2. It should be appreciated that in Method 1, the objective function was implanted in the chaos circuit itself. However, in Method 2 and Method 3, the objective function is implanted in the software, with Methods 2 and 3 differing in how the bifurcation parameters are controlled to arrive at a solution. In addition, it should be appreciated that the present disclosure also covers the case of implanting the object function in both the chaos circuit and in the software simultaneously. In FIG. 16, the problem is analyzed and an appropriate objective function constructed 512, and implanted 514 into the programming (software). In this embodiment, the objective function is implemented in software, which controls a physical matrix circuit which generates solutions. The software (programming reads out the solutions and determines the associated cost by plugging the solution into the objective function. Software performs steps 512, 514, 518, 520, and 526; while modification of bifurcation parameter 516, 522, 524 is performed by the software to control the physical hardware circuit. Using software to implement the objective function and drive the state of a physical hardware state also applies in the other descriptions for Method 2 and Method 3. Instructions executing on the processor cause it to modify bifurcation parameters to drive 516 circuits into the SOCr regime. The solution is read out from the matrix circuit and its objective function value determined 518 in software. A decision is made in block 520 whether the current objective function value is lower than the previous. If the current objective function value is lower than the previous, then the matrix circuit is driven 522 closer to the Markovian regime by modifying bifurcation parameters, after which solution tracking is performed 526, with returns to block 518, until cost is sufficiently low. Returning to block 520, when the value of the objective function is not lower than previous, then the matrix circuit is driven 524 closer to the chaotic regime, after which solution tracking 526 is performed along with checking for a low enough cost solution.

Figure 17A:
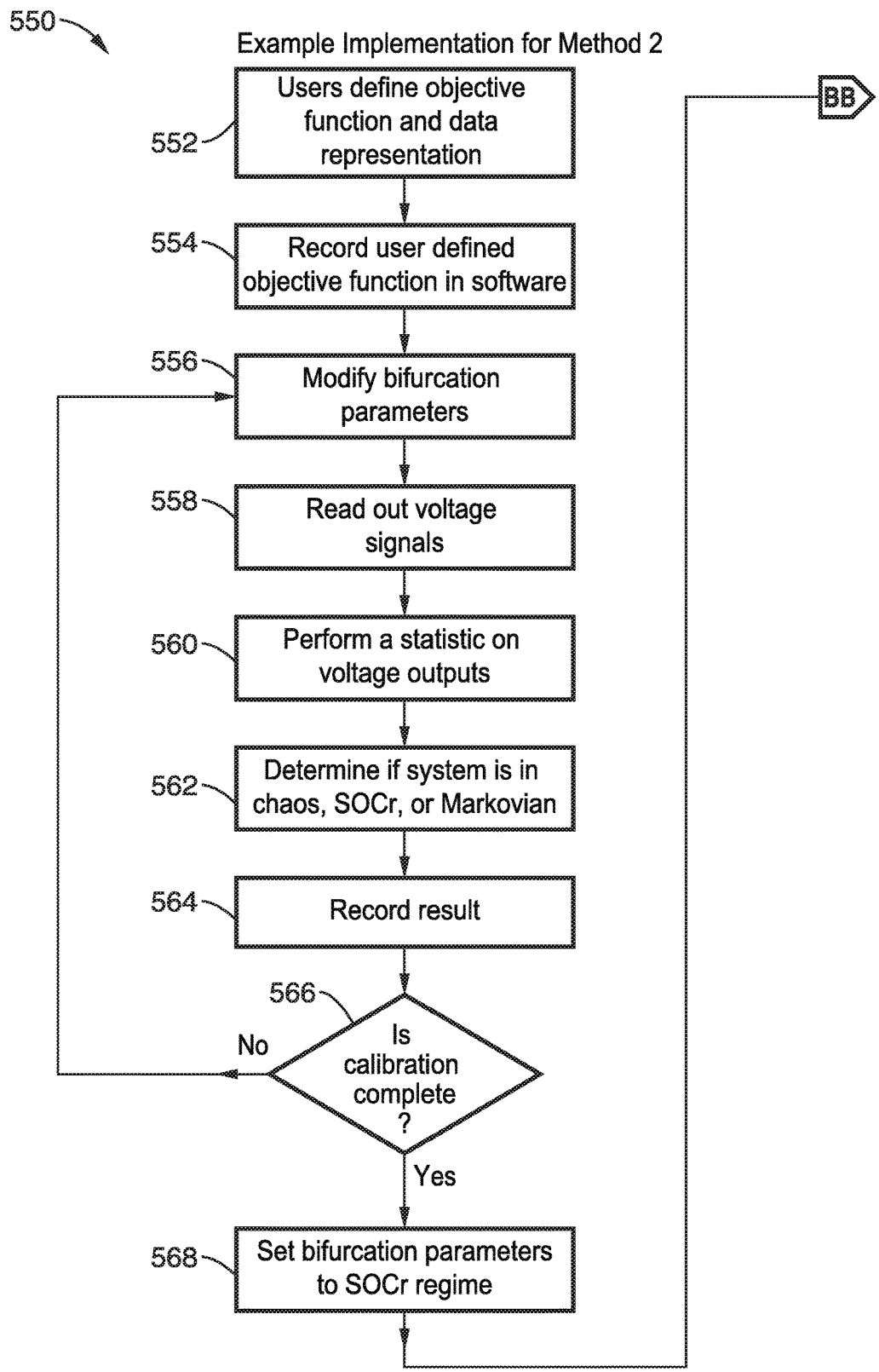
FIG. 17A and FIG. 17B are a flow diagram of the implementation process for the second method (Method 2) in solving the problem of interest using the chaotic CMOS circuit according to an embodiment of the invention.
Figure 17B:
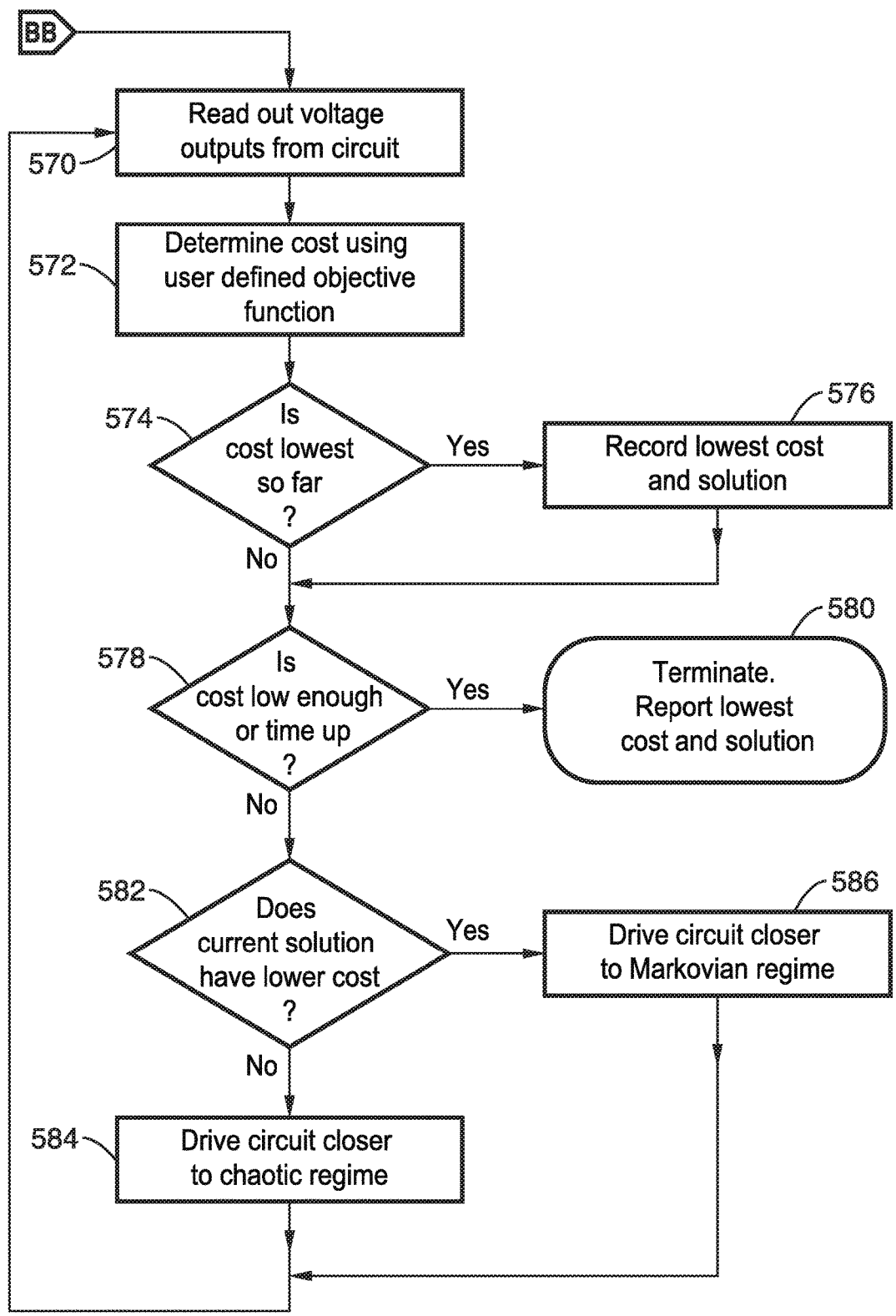

FIG. 17A and FIG. 17B illustrates an example embodiment 550 of software for implementing Method 2. In block 552 users define objective function and data representation, which is registered (recorded) 554 for use by the processor (in software). A calibration loop is entered (steps 556-566). Bifurcation parameters are modified 556, voltage levels read out 558, statistics taken 560 on voltage outputs, a determination is made 562 and recorded 564 if the system is in chaos, SOCr, or Markovian modes. A check 566 is made if calibration is complete. The calibration is completed when enough bifurcation parameter mapping is recorded. The amount of required mapping depends on the desired accuracy level for the solution. The system will be able to make finer adjustments during the annealing operation if smaller step size is used in the mapping table. If calibration is not complete, then execution returns to the top of the loop in block 556. Otherwise, execution continues with setting bifurcation parameters to SOCr regime 568 in the matrix circuit, reading out 570 voltage outputs from the matrix circuit and determining 572 cost using the user defined objective function. A check is made 574 for lowest cost so far, and if met then this lowest cost is recorded 576. Processing continues to check 578 if this cost is sufficiently low, and if met then this process terminated and the lowest cost and solution are reported 580. Otherwise a check is made 582 if the current solution has a lower cost. If the current solution has a lower cost, then the matrix circuit is driven closer to the Markovian regime 586, otherwise the matrix circuit is driven closer to the chaotic regime 584. After which execution proceeds back to block 570 for another pass.

The disclosure additionally presents a third method of operating the system, referred to as Method 3. Instead of comparing the current cost, the system adjusts the bifurcation parameters according to the lowest cost found so far. If the lowest cost is decreasing, the programming is configured to move the system closer to the Markovian regime. Otherwise, if the lowest cost does not decrease further for a while, the programming is configured to move the circuit closer to the chaotic regime. The system process terminates when the cost is sufficiently low, or an allowed time factor criterion has been met.

Figure 18:
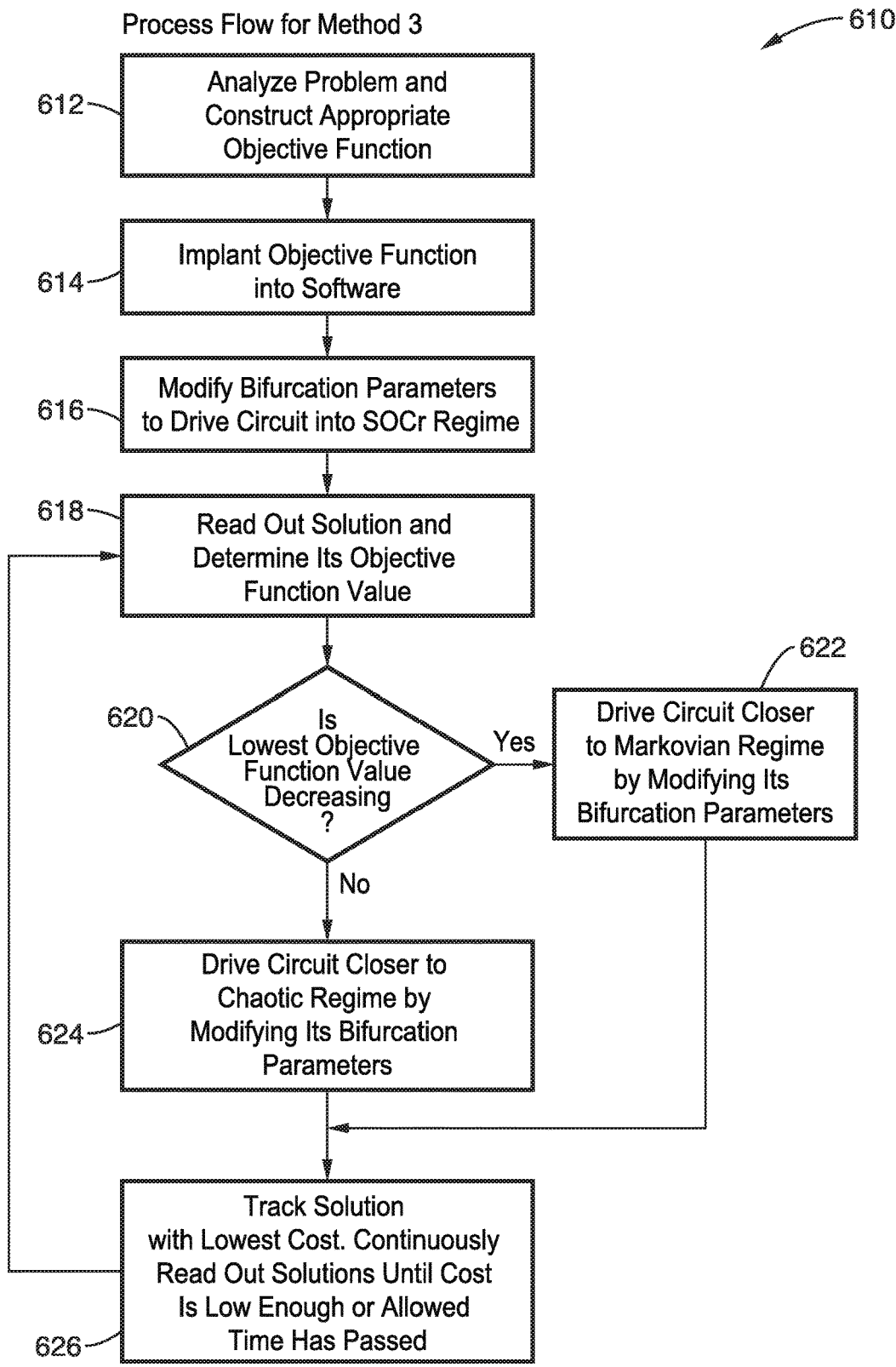
FIG. 18 is a flow diagram of process flow for a third method (Method 3) in solving the problem of interest using the chaotic CMOS circuit according to an embodiment of the invention.

FIG. 18 illustrates an example embodiment 610 of Method 3. The programming performs analyzing 612 of the problem and constructing an objective function, and planting 614 this objective function into the system memory. Based on this objective function 614, bifurcation parameters are modified by the programming to drive 616 the matrix circuit into the SOCr regime. A loop is started for finding the sufficiently low cost solution (or lowest cost solution). A solution is read out with its objective value determined 618, after which a check is made if the objective function value is decreasing 620. If the function value is decreasing then the matrix circuit is driven closer to the Markovian regime 622, by modifying bifurcation parameters. Otherwise, with a non-decreasing function value the matrix circuit is driven closer to the chaotic regime 624. If the checks 626 for a sufficiently low cost solution fail, and the time threshold for execution has not been exceeded, then another loop pass commences at block 618. Otherwise, the solution and its cost can be read out. In either case execution then returns to the top 570 of this solution seeking loop.

Figure 19A:
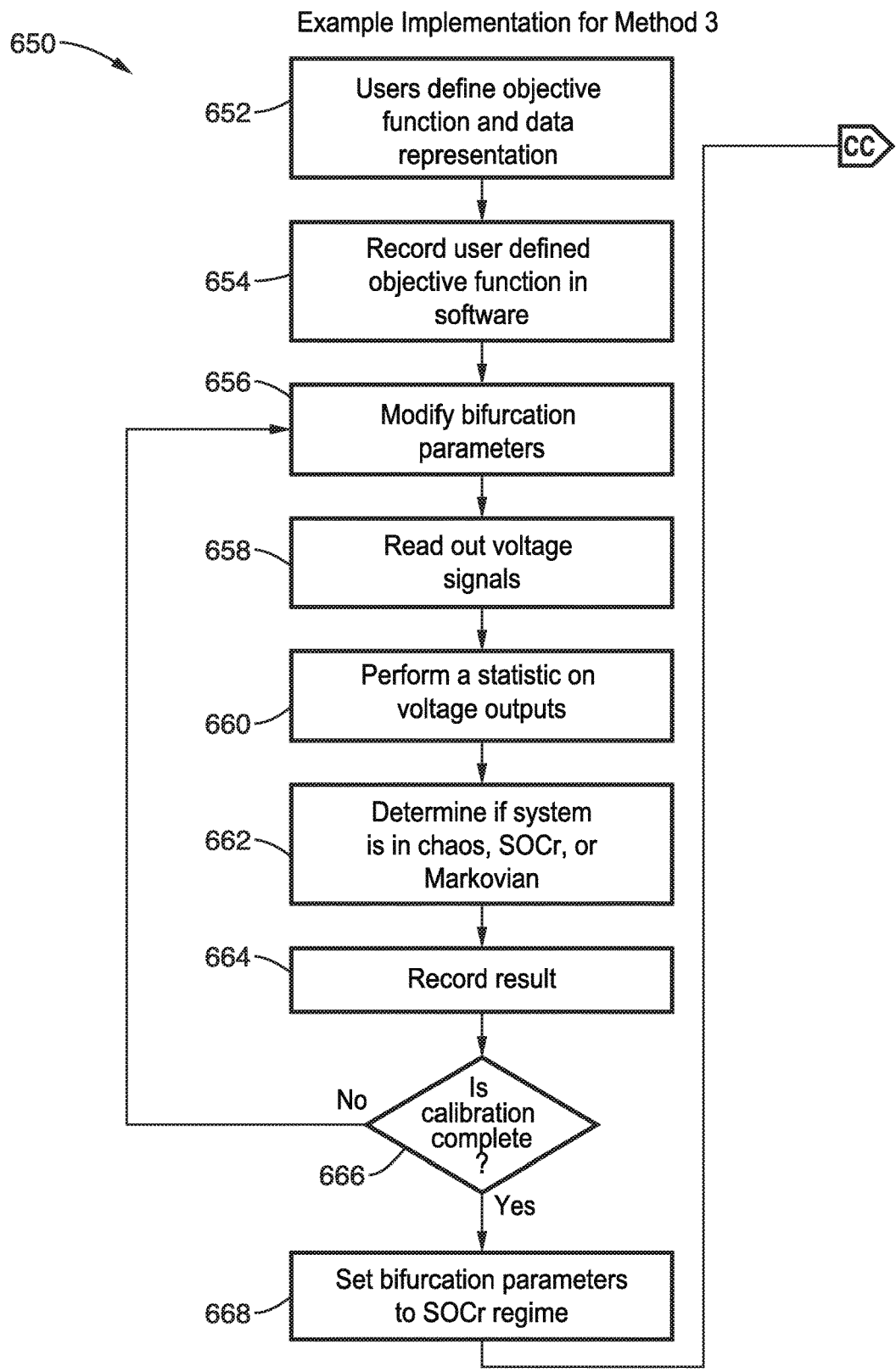
FIG. 19A and FIG. 19B are a flow diagram of the implementation process for the third method (Method 3) in solving the problem of interest using the chaotic CMOS circuit according to an embodiment of the invention.
Figure 19B:
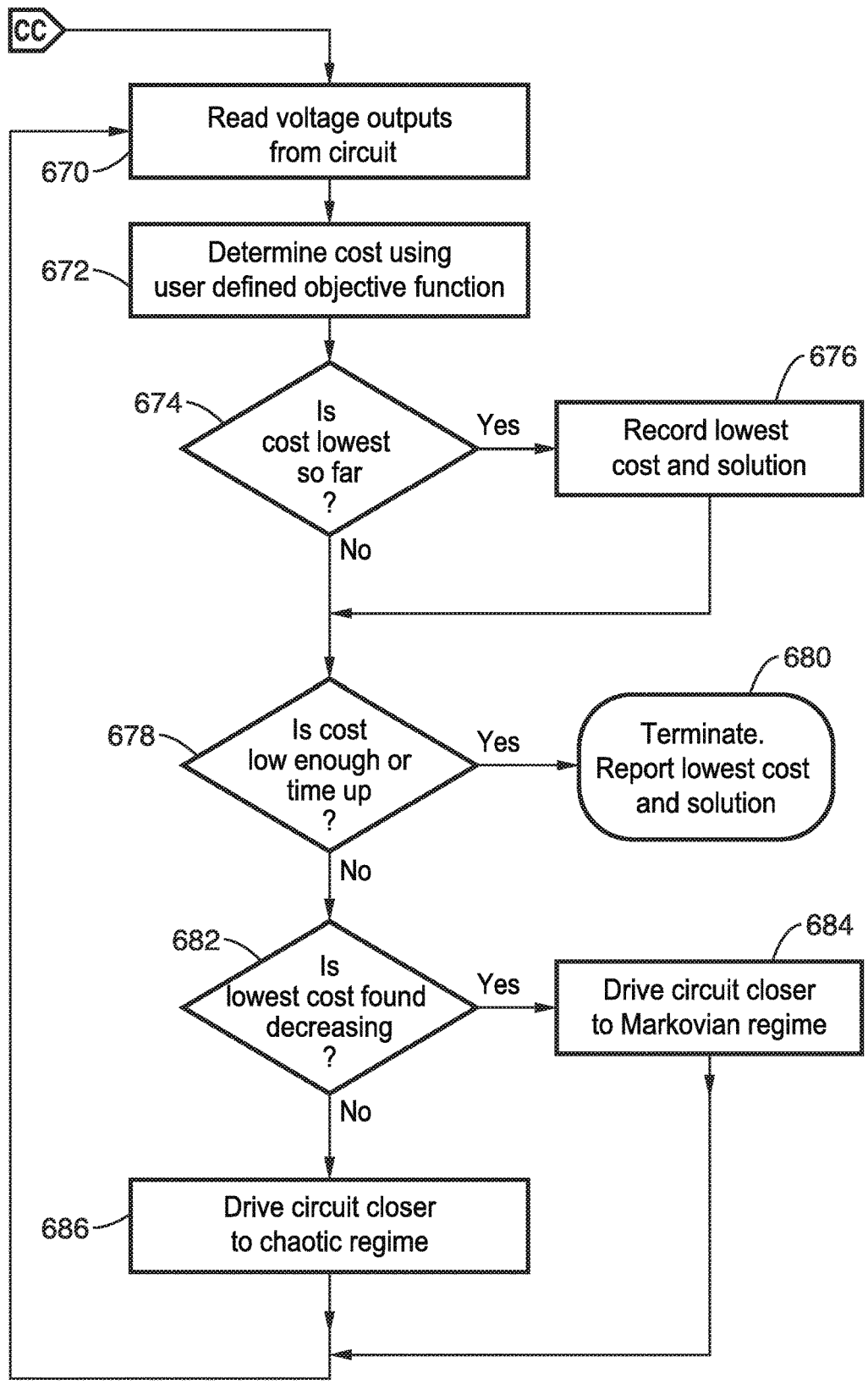

FIG. 19A and FIG. 19B illustrates an example embodiment 650 for implementing the software used in Method 3. In block 652 the objective function and data representation are user defined, and this is registered (recorded) 654 for use by the processor (in software). A calibration loop is entered (steps 656-666). Bifurcation parameters are modified 656, voltage levels read out 658, statistics taken 660 on voltage outputs, a determination is made 662 and recorded 664 if the system is in chaos, SOCr, or Markovian modes. A check 666 is made if calibration is complete. The calibration procedure, including the criteria for completing the calibration, is identical to the one in Method 1 and Method 2. If calibration is not complete, then execution returns to the top of the loop in block 656. Otherwise, execution continues with setting bifurcation parameters to SOCr regime 668 in the matrix circuit, reading out 670 voltage outputs from the matrix circuit and determining 672 cost using the user defined objective function. A check is made 674 for lowest cost so far, and if met, then this lowest cost is recorded 676. Processing continues to check 678 if this cost is sufficiently low, and if met then this process is terminated and the lowest cost and solution are reported 680. Otherwise a check is made 682 if the lowest cost found is decreasing 682. If cost is found to be decreasing, then the matrix circuit is driven closer to the Markovian regime 684, otherwise the matrix circuit is driven closer to the chaotic regime 686. As an example, one implementation for 682, 684, and 686 can be that if the matrix circuit fails to produce a solution that beats the lowest cost in the past 100 iteration cycles, the software will drive the matrix circuit towards chaos in order to promote creating a very different solution. The number of iterations the system needs to wait before driving toward chaos can vary. In either case execution then returns to the top 670 of this solution seeking loop.

Figure 20:
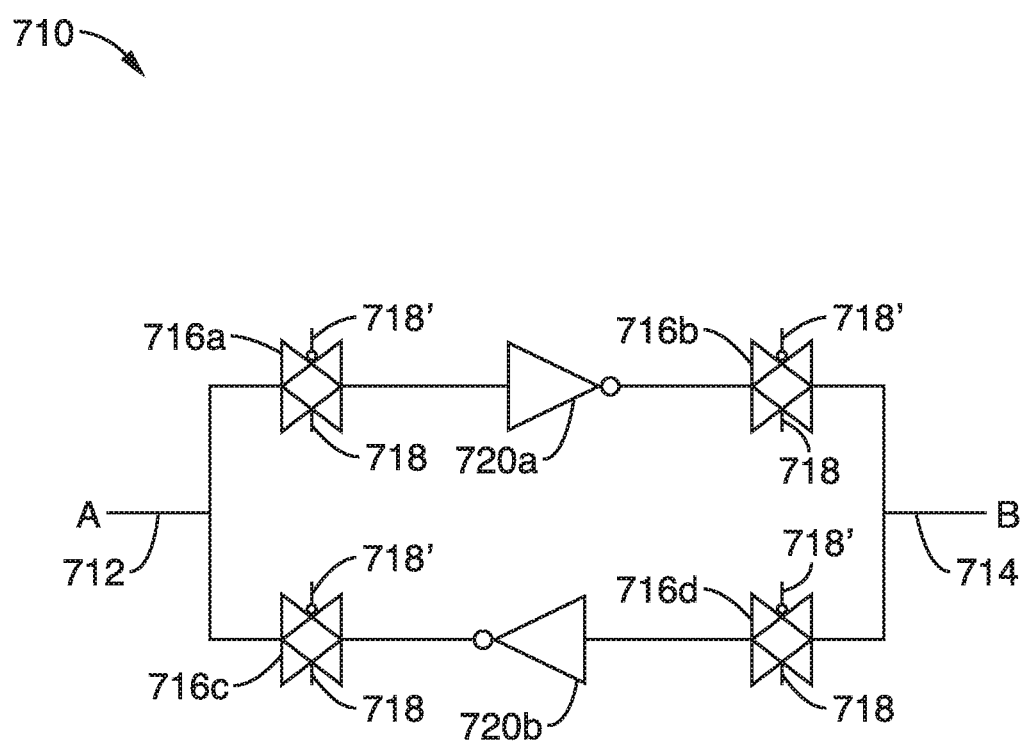
FIG. 20 is a schematic for an alternative implementation of the coupling element according to an embodiment of the present disclosure.

FIG. 20 is an example embodiment 710 of a circuit element configured for coupling two neighboring unit cells. Unlike the transmission gates seen in FIG. 9 through FIG. 12 that bring the voltage at terminal A and the voltage at terminal B closer to each other, this new coupling element forces the voltage at terminal A and the voltage at terminal B to be opposite of each other when the control signal W is high. In the circuit diagram of this coupling element, two matrix circuit connections 712 (A) and 714 (B) are seen. Transmission gates 716a, 716b control transmission to first polarity of inverter 720a, while transmission gates 716c, 716d control transmission to a second polarity of inverter 720b. Control of the all four transmission gates is seen using the same signals 718 (W) and 718' (W').

It should be appreciated that if the resistance is high, A and B are isolated. If resistance is low, A and B will be forced to opposite polarities. The lower the resistance is, the more opposite force will be applied. A chaos matrix can be implemented with just this form of transmission gate (coupling circuit), or solely using one of the other types seen in FIG. 10 through FIG. 12, or more preferably utilizing a combination of these coupling circuits in the chaos circuit. It should be noted that the coupling circuit of FIG. 20 is controlled differently; in particular, when the coupling circuits of FIG. 10 through FIG. 12 would be high resistance, the circuit of FIG. 20 would be low resistance and vice versa. It should also be noted that variations of FIG. 20 are contemplated without departing from the disclosure, for example removing transmission gates 716a and 716d without impacting functionality, or to combine transmission gate 716b with the inverter 720a to form a tri state NOT gate, while similarly 716c can be combined with 720b, as well as various combinations thereof. This coupling element can be used to replace or work in conjunction with the previously described transmission gate in order to provide more flexibility in implanting the objective function.

As an example of using this coupling element, the transmission gates from FIG. 9 through FIG. 12 resemble ferromagnetic connections between adjacent oscillators which are inclined toward having similar voltages. However, considering the coupling element, it resembles an antiferromagnetic connection, in which two neighboring voltages will drift apart from each other. Therefore, this coupling element allows implementing an objective function that has the form of the Ising model using these two connection types.

Figure 21:
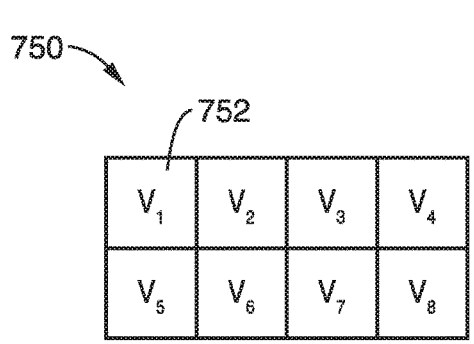
FIG. 21 is a diagram of a matrix of voltages generated from the chaotic CMOS circuit according to an embodiment of the present disclosure.

FIG. 21 depicts an example 750 of voltage outputs $V_1$ through $V_8$, from the matrix circuit. For example, $V_1$ 752 in FIG. 21 is the same voltage as $V_1$ in FIG. 1. After these voltages are captured by the data latches, such as seen by 322 in FIG. 13, then they will only have binary values (i.e., high or low).

Figure 22:
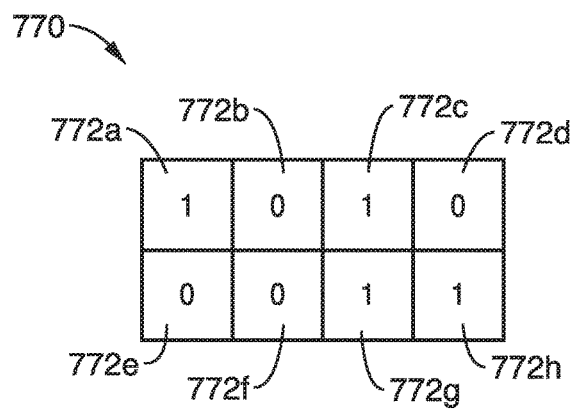
FIG. 22 is a diagram of a solution generated from the chaotic CMOS circuit according to an embodiment of the present disclosure.

FIG. 22 depicts an example 770 of data stored in the data latches. A bit is denoted as "1" when it is high, and "0" when it is low. In the figure, bits 772a, 772b, 772c, 772d, and 772e are digitized from voltages $V_1$, $V_2$, $V_3$, $V_4$, and $V_5$ in FIG. 21, and in similar manner 772f, 772g, 772h for other voltages. The bits in this figure are seen as encoding a particular solution to the problem of interest.

Figure 23:
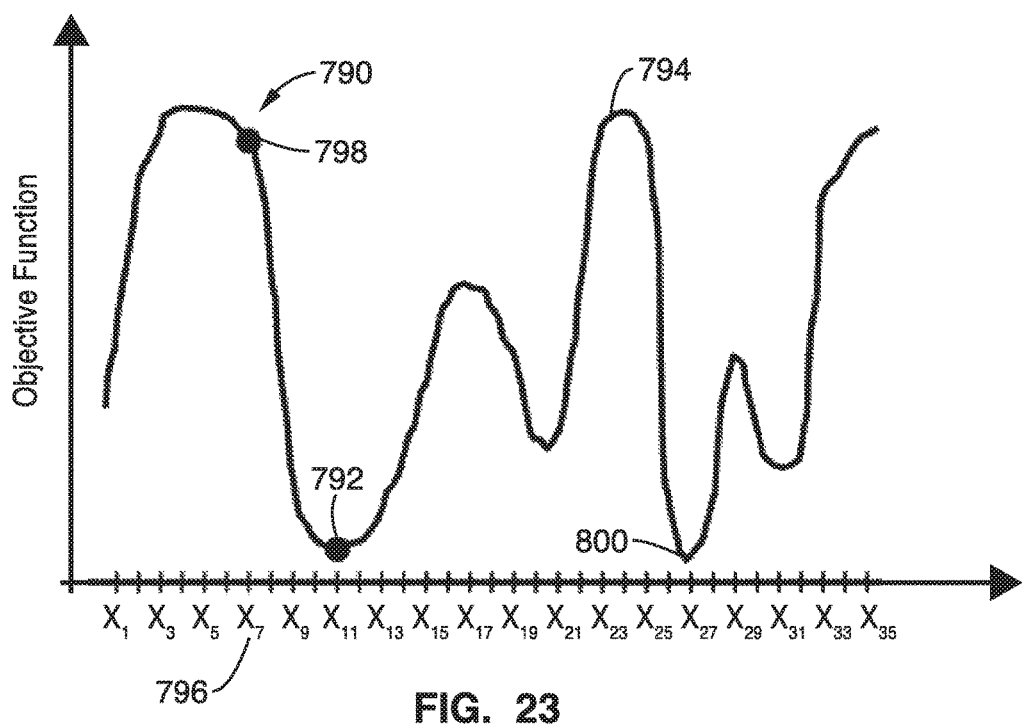
FIG. 23 is a plot of an objective function as a function of possible solutions generated according to an embodiment of the present disclosure.

FIG. 23 is an example of an objective function 790, with $X_1$ to $X_{35}$ being possible solutions that can be generated from the chaotic circuit. Each solution has a corresponding objective function value. For instance, $X_7$ 796 has an objective function value seen at 798. In this example, the goal is to find the solution $X_{27}$ 800 that generates the global minimum. The system adjusts bifurcation parameters to slowly drive the matrix circuit away from the chaotic regime, and past function value peak 794, with the circuit converging to the global minimum 800 at $X_{27}$ with high probability. In the majority of times, the matrix circuit is in the self-organized critical (SOCr) phase. Although it is possible that the circuit will get into a valley that does not contain the global minimum, such as seen at valley 792, spanning about $X_9$ through $X_{13}$ the circuit still has a chance to escape this valley because large rearrangements can still occur according to the power law distribution.

The present system converges to global minimum much faster than conventional SA or CA implemented in software due to the following reasons. Firstly, the system tends to avoid solutions that lead to high objective function values and loops around the valleys of the energy landscape. Secondly, when the chaotic matrix circuit is in self-organized criticality (SOCr), it is not limited by the energy barriers, so it can produce patterns that are very distinct. Thirdly, the self-organized critical pattern generator is less likely to repeat the same pattern when it is near chaos. Lastly, the random pattern generator updates multiple variables at once instead of updating them in sequence as in conventional computers.

The controller (processor) utilized for controlling the coupling strengths and bifurcation parameters of the matrix circuit (lattice circuit) can be implemented using various types of processing circuits. In at least one preferred embodiment, the controller includes at least one computer processor and associated memory (media) for storing instructions and data. This memory, or computer readable media, may be implemented of any desired type. However, it will also be appreciated that the computer readable media (memory storing instructions) in the processor (e.g., 312 in FIG. 13) is "non-transitory", otherwise this computer readable media comprises any and all forms of computer-readable media. Accordingly, the disclosed technology may comprise any form of computer-readable media, including those which are random access (e.g., RAM), require periodic refreshing (e.g., DRAM), those that degrade over time (e.g., EEPROMS, disk media), or that store data for only short periods of time and/or only in the presence of power, with the only limitation being that the term "computer readable media" is not applicable to an electronic signal which is transitory.

Embodiments of the present technology may be described with reference to flowchart illustrations of methods and systems according to embodiments of the technology, and/or algorithms, formulae, or other computational depictions, which may also be implemented as computer program products. In this regard, each block or step of a flowchart, and combinations of blocks (and/or steps) in a flowchart, algorithm, formula, or computational depiction can be implemented by various means, such as hardware, firmware, and/or software including one or more computer program instructions embodied in computer-readable program code logic. As will be appreciated, any such computer program instructions may be loaded onto a computer, including without limitation a general purpose computer or special purpose computer, or other programmable processing apparatus to produce a machine, such that the computer program instructions which execute on the computer or other programmable processing apparatus create means for implementing the functions specified in the block(s) of the flowchart(s).

Accordingly, blocks of the flowcharts, algorithms, formulae, or computational depictions support combinations of means for performing the specified functions, combinations of steps for performing the specified functions, and computer program instructions, such as embodied in computer-readable program code logic means, for performing the specified functions. It will also be understood that each block of the flowchart illustrations, algorithms, formulae, or computational depictions and combinations thereof described herein, can be implemented by special purpose hardware-based computer systems which perform the specified functions or steps, or combinations of special purpose hardware and computer-readable program code logic means.

Furthermore, these computer program instructions, such as embodied in computer-readable program code logic, may also be stored in a computer-readable memory that can direct a computer or other programmable processing apparatus to function in a particular manner, such that the instructions stored in the computer-readable memory produce an article of manufacture including instruction means which implement the function specified in the block(s) of the flowchart(s). The computer program instructions may also be loaded onto a computer or other programmable processing apparatus to cause a series of operational steps to be performed on the computer or other programmable processing apparatus to produce a computer-implemented process such that the instructions which execute on the computer or other programmable processing apparatus provide steps for implementing the functions specified in the block(s) of the flowchart(s), algorithm(s), formula(e), or computational depiction(s).

It will further be appreciated that "programming" as used herein refers to one or more instructions that can be executed by a processor to perform a function as described herein. The programming can be embodied in software, in firmware, or in a combination of software and firmware. The programming can be stored local to the device in non-transitory media, or can be stored remotely such as on a server, or all or a portion of the programming can be stored locally and remotely. Programming stored remotely can be downloaded (pushed) to the device by user initiation, or automatically based on one or more factors. It will further be appreciated that as used herein, that the terms processor, central processing unit (CPU), and computer are used synonymously to denote a device capable of executing the programming and communication with input/output interfaces and/or peripheral devices.

From the description herein, it will be appreciated that that the present disclosure encompasses multiple embodiments which include, but are not limited to, the following:

1. An apparatus for solving optimization problems, comprising: (a) a circuit lattice having a plurality of unit cells interconnected by a matrix of transmission gates; (b) wherein each unit cell is configured for setting a voltage as a state variable in the circuit lattice for each unit cell position; (c) wherein the transmissive mode of each transmission gate is configured for being set in response to receiving a control signal to establish the transmissive mode of said transmission gate; (d) a controller configured for outputting bifurcation control signals to change operating characteristics of at least a portion of the unit cells, and for outputting coupling strength control signals for changing transmission characteristics of said transmission gates when implanting an objective function in said circuit lattice; (e) a voltage registration circuit configured for registering state variable voltages in said circuit matrix and outputting these state variable voltages as digital signals to said controller; (f) wherein said controller is configured for implanting a problem of interest into the circuit matrix, and for controlling bifurcation to drive said matrix circuit between chaos, self-organized critical, or Markovian regimes by modifying bifurcation parameters, until a desired solution is obtained.

2. The apparatus of any preceding embodiment, wherein the unit cells can be arranged in many different shapes of lattice formation.

3. The apparatus of any preceding embodiment, wherein the unit cells can have any number of connections to their neighboring cells.

4. The apparatus of any preceding embodiment, wherein said change in operating characteristics of the unit cells changes between having a stable state output, to that of having an oscillating output signal, depending on the state of the bifurcation control signal received.

5. The apparatus of any preceding embodiment, wherein each said unit cell comprises a number of active elements within an oscillator circuit having a forward path through which an oscillator signal propagates and a feedback path from oscillator output to oscillator input; and wherein said oscillator is configured for having one of its stages selectively enabling or disabled through which the oscillator signal propagates in response to receiving said bifurcation signal.

6. The apparatus of any preceding embodiment, wherein the unit cells comprise a plurality of inverters connected in series.

7. The apparatus of any preceding embodiment, wherein one or more of the inverters can be bypassed or turned off changing the mode of the unit cell from an oscillator mode to circuit having steady states.

8. The apparatus of any preceding embodiment, wherein said transmission gate is configured so that the transmissive mode of resistance in said transmission gate changes in response to receiving said coupling strength control signals.

9. The apparatus of any preceding embodiment, wherein said transmission gate is further configured with polarity reversal so that opposing voltages are forced at opposing ends of said transmissive gate.

10. The apparatus of any preceding embodiment, wherein said controller comprises a digital control circuit configured for outputting control signals to the unit cells and transmission gates and for processing voltage states read from the lattice circuit.

11. The apparatus of any preceding embodiment, wherein said controller comprises at least one processing element and at least one memory configured for storing instructions executable on the processing element.

12. The apparatus of any preceding embodiment, wherein said voltage registration circuit comprises latch circuits configured for converting voltage signals at the nodes of said lattice circuit to digital signals readable by said controller.

13. The apparatus of any preceding embodiment, wherein each said latch circuit upon receiving a clock signal digitizes and records a voltage signal at one node of said lattice circuit.

14. The apparatus of any preceding embodiment, wherein said voltage registration circuit comprises analog to digital conversion for converting voltage signals at the nodes of said lattice circuit to digital signals which can be read by said controller.

15. The apparatus of any preceding embodiment, wherein the matrix of bits output from the voltage registration circuit represent a solution to the problem of interest, which is interpreted by the controller, which records the lowest objective function value (cost of a solution) and the solution that gives the lowest objective function value.

16. The apparatus of any preceding embodiment, further comprising: a plurality of noise sources; wherein said circuit or system operates in a self-organized phase; and wherein width of the self-organized phase is controlled by modifying amplitude of the noise sources.

17. The apparatus of any preceding embodiment, wherein the chaotic circuit comprises a plurality of non-linearly coupled oscillators connected through said lattice formation.

18. The apparatus of any preceding embodiment, wherein said desired solution is obtained based on an objective function value, called a cost function, of these solutions to the objective function.

19. The apparatus of any preceding embodiment, wherein said cost function of the solutions is determined from the circuit lattice, or determined by utilizing a computer processor configured for analyzing cost functions.

20. An apparatus for solving optimization problems, the system comprising: (a) a chaotic circuit comprising: (a)(i) a plurality of unit cells, with each unit cell comprising a plurality of transistors that set voltages as state variables in a lattice formation; (a)(ii) wherein said state variables are coupled electrically to one another through said lattice formation; and (a)(iii) selectable modes in the unit cells, which in response to receiving bifurcation parameters bring the chaotic circuit in and out of the chaotic regime; (b) a processing unit and instructions executable on the processing unit for implanting a problem of interest into the chaotic circuit; and (c) data latches or analog to digital converters to read out the voltages from the chaotic circuit.

21. The apparatus of any preceding embodiment, wherein the unit cells can be arranged in many different shapes of lattice formation.

22. The apparatus of any preceding embodiment, wherein the unit cells can have any number of connections to their neighboring cells.

23. The apparatus of any preceding embodiment, wherein the unit cells comprise a plurality of inverters connected in series.

24. The apparatus of any preceding embodiment, wherein one or more of the inverters can be bypassed or turned off which changes unit cell mode from an oscillator mode to circuit having steady states.

25. The apparatus of any preceding embodiment, wherein the objective function is implanted in the lattice formation by setting different coupling strengths between the state variables.

26. The apparatus of any preceding embodiment, wherein electrical coupling between unit cells in the lattice formation is implemented using a circuit that exhibits nonlinear connections between two adjacent unit cells.

27. The apparatus of any preceding embodiment, wherein said processing unit and instructions executable on the processing unit are further configured for identifying self-organized critical (SOCr) regime from output voltages of said chaos circuit which is driven to chaos, self-organized critical, or Markovian regimes by modifying bifurcation parameters sent to the unit cells.

28. The apparatus of any preceding embodiment, further comprising: a plurality of noise sources; wherein said circuit or system operates in a self-organized phase; and wherein width of the self-organized phase is controlled by modifying amplitude of the noise sources.

29. The apparatus of any preceding embodiment, wherein the chaotic circuit comprises a plurality of non-linearly coupled oscillators.

30. The apparatus of any preceding embodiment, wherein said desired solution is obtained based on an objective function value, called a cost function, of these solutions to the objective function.

31. The apparatus of any preceding embodiment, wherein said cost function of the solutions is determined from the circuit lattice, or determined by utilizing a computer processor configured for analyzing cost functions.

32. A method for solving optimization problems, comprising: (a) constructing an objective function for a problem of interest; (b) implanting the objective function into a processor configured for controlling a chaos circuit, or the chaos circuit itself; (c) wherein said chaos circuit comprises a plurality of unit cells interconnected in a lattice formation; (d) controlling the bifurcation parameters of the chaos circuit by sending signals from a processor to change the electrical properties of the circuit elements in said chaos circuit; (e) finding values of bifurcation parameters that drive the chaos circuit into chaos or self-organized criticality by modifying bifurcation parameters used for controlling unit cell function between an oscillator mode and a mode which exhibits steady state output; (f) slowly driving the chaos circuit from chaos, through the self-organized critical phase, and into the Markovian regime; and (g) continuously reading out solutions while the circuit is being moved out of chaos and keeping track of the solution that has the lowest cost.

33. A method for solving optimization problems, comprising: (a) constructing an objective function for a problem of interest; (b) implanting the objective function into a chaos circuit having a plurality of unit cells interconnected in a lattice formation; (c) finding values of bifurcation parameters that drive the chaos circuit into chaos or self-organized criticality by modifying bifurcation parameters used for controlling unit cell function between an oscillator mode and a mode which exhibits steady state output; (d) slowly driving the chaos circuit from chaos, through the self-organized critical phase, and into the Markovian regime; and (e) continuously reading out solutions until a solution with a sufficiently low cost is found, or until an allowed time threshold has been reached.

34. A method for solving optimization problems, comprising: (a) constructing an objective function for a problem of interest; (b) implanting the objective function in software executable on a processor in the circuit or system; (c) finding values of bifurcation parameters that drive the system into chaos or self-organized criticality and putting the circuit or system into self-organized criticality by modifying the bifurcation parameters; (d) continuously reading out solutions and calculating their costs using said software; (e) driving the circuit closer to chaos by changing its bifurcation parameters if the cost of the current solution is high, and driving the circuit closer to the Markovian regime if the cost of the current solution is low; and (f) tracking solution cost, and outputting a solution with the lowest cost.

35. A method for solving optimization problems, comprising: (a) constructing an objective function for a problem of interest to be solved in a chaos system; (b) implanting the objective function in software executable on a processor of the chaos system; (c) finding values of bifurcation parameters that drive the chaos system into chaos or self-organized criticality and putting the circuit or system into self-organized criticality by modifying the bifurcation parameters; (d) continuously reading out solutions and calculating their costs using said software; (e) tracking solution cost; and (f) driving the circuit closer to chaos by changing its bifurcation parameters if the said lowest cost is not decreasing, and driving the circuit closer to the Markovian regime if said lowest cost is decreasing, until a sufficiently low cost solution is obtained.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

In the claims, reference to an element in the singular is not intended to mean "one and only one" unless explicitly so stated, but rather "one or more." All structural and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

What is claimed is:

1. An apparatus for solving optimization problems, comprising:
   (a) a circuit lattice having a plurality of unit cells interconnected by a matrix of transmission gates;
   (b) wherein each unit cell is configured for setting a voltage as a state variable on a node in the circuit lattice for each unit cell position; and
   (c) wherein a transmissive mode of each transmission gate from said matrix of transmission gates is configured for being set in response to receiving a control signal to establish the transmissive mode of said transmission gate;

(d) a controller configured for outputting bifurcation control signals to change operating characteristics of at least a portion of the unit cells, and for outputting coupling strength control signals for changing transmission characteristics of said transmission gates when implanting an objective function in said circuit lattice; and (e) a voltage registration circuit configured for registering state variable voltages in said circuit lattice and outputting these state variable voltages as digital signals to said controller;

(f) wherein said controller is configured for implanting a problem of interest into the circuit lattice, and for controlling bifurcation to drive said circuit lattice between chaos, self-organized critical, or Markovian regimes by modifying bifurcation parameters, until a desired solution is obtained.

2. The apparatus as recited in claim 1, wherein the unit cells can be arranged in many different shapes of lattice formation.

3. The apparatus as recited in claim 1, wherein the unit cells can have any number of connections to their neighboring cells.

4. The apparatus as recited in claim 1, wherein said change in operating characteristics of the unit cells changes between having a stable state output, to that of having an oscillating output signal, depending on the state of the bifurcation control signal received.

5. The apparatus as recited in claim 1:
wherein each said unit cell comprises a number of active elements within an oscillator circuit having a forward path through which an oscillator signal propagates and a feedback path from oscillator circuit output to oscillator circuit input; and
wherein said oscillator circuit is configured for having one of its stages selectively enabling or disabled through which the oscillator signal propagates in response to receiving said bifurcation signal.

6. The apparatus as recited in claim 1, wherein the unit cells comprise a plurality of inverters connected in series.

7. The apparatus as recited in claim 6, wherein one or more of the inverters, from said plurality of inverters, can be bypassed or turned off changing a mode of the unit cell from an oscillator mode to that of a circuit having steady states.

8. The apparatus as recited in claim 1, wherein said transmission gate is configured so that the transmissive mode of resistance in said transmission gate changes in response to receiving said coupling strength control signals.

9. The apparatus as recited in claim 8, wherein said transmission gate is further configured with polarity reversal so that opposing voltages are forced at opposing ends of said transmissive gate.

10. The apparatus as recited in claim 1, wherein said controller comprises a digital control circuit configured for outputting control signals to the unit cells and transmission gates and for processing voltage states read from the circuit lattice.

11. The apparatus as recited in claim 10, wherein said controller comprises at least one processing element and at least one memory configured for storing instructions executable on the processing element.

12. The apparatus as recited in claim 1, wherein said voltage registration circuit comprises latch circuits configured for converting voltage signals at nodes of said lattice circuit to digital signals readable by said controller.

13. The apparatus as recited in claim 12, wherein each said latch circuit upon receiving a clock signal digitizes and records a voltage signal at one node of said circuit lattice.

14. The apparatus as recited in claim 1, wherein said voltage registration circuit comprises analog to digital conversion for converting voltage signals at nodes of said circuit lattice to digital signals which can be read by said controller.

15. The apparatus as recited in claim 1, wherein the state variable voltages output as digital signals to said controller output from the voltage registration circuit, as a matrix of bits, represent a solution to the problem of interest, which is interpreted by the controller, which records the lowest objective function value (cost of a solution) and the solution that gives the lowest objective function value.

16. The apparatus as recited in claim 1, further comprising:
a plurality of noise sources;
wherein said circuit or system operates in a self-organized phase; and
wherein width of the self-organized phase is controlled by modifying amplitude of the noise sources.

17. The apparatus as recited in claim 1, wherein the chaotic circuit comprises a plurality of non-linearly coupled oscillators connected through said circuit lattice formation.

18. The apparatus as recited in claim 1, wherein said desired solution is obtained based on an objective function value, called a cost function, of these solutions to the objective function.

19. The apparatus as recited in claim 18, wherein said cost function of the solutions is determined from the circuit lattice, or determined by utilizing a computer processor configured for analyzing cost functions.

\* \* \* \* \*